US012124422B2

(12) United States Patent
Finkelstein et al.

(10) Patent No.: US 12,124,422 B2
(45) Date of Patent: Oct. 22, 2024

(54) DISTRIBUTED STORAGE OF METADATA FOR LARGE BINARY DATA

(71) Applicant: eBay Inc., San Jose, CA (US)

(72) Inventors: Yuri Finkelstein, San Carlos, CA (US);
Birzhan Amirov, San Jose, CA (US);
Leonid Lokshin, San Carlos, CA (US);
Harihara Kadayam, Fremont, CA (US)

(73) Assignee: eBay Inc., San Jose, CA (US)

( * ) Notice: Subject to any disclaimer, the term of this patent is extended or adjusted under 35 U.S.C. 154(b) by 72 days.

(21) Appl. No.: 17/223,439

(22) Filed: Apr. 6, 2021

(65) Prior Publication Data

US 2021/0224241 A1    Jul. 22, 2021

Related U.S. Application Data

(63) Continuation of application No. 15/638,952, filed on Jun. 30, 2017, now Pat. No. 11,030,176.

(Continued)

(51) Int. Cl.
*G06F 16/27* (2019.01)
*G06F 16/22* (2019.01)
(Continued)

(52) U.S. Cl.
CPC ...... *G06F 16/2255* (2019.01); *G06F 16/2379* (2019.01); *G06F 16/245* (2019.01); *G06F 16/27* (2019.01)

(58) Field of Classification Search
CPC .... G06F 16/273; G06F 16/275; G06F 16/278; G06F 16/2255; G06F 16/2379; G06F 16/245; G06F 16/27
See application file for complete search history.

(56) References Cited

U.S. PATENT DOCUMENTS 7,013,379 B1 * 3/2006 Testardi ............... G06F 3/0613
711/E12.067
7,240,151 B1    7/2007 Todd et al.
(Continued)

OTHER PUBLICATIONS

Understanding Vitess, Retrieved from ttle Internet: <URL:tlttp:I/vitess.io/overview/>, (Accessed Jul. 1, 2016)., pp. 1-8.
(Continued)

*Primary Examiner* — Cheyne D Ly
(74) *Attorney, Agent, or Firm* — FIG. 1 Patents

(57) ABSTRACT

In an example embodiment, a distributed storage system includes a service tier including a service node to receive a request for a logical object comprising binary data and metadata describing the binary data, and a storage tier including a plurality of storage nodes, wherein one or more of the storage nodes is to store the metadata describing the binary data. The distributed storage system also includes a coordination tier to store mapping information identifying the one or more of the storage nodes storing the metadata. The service node is also to receive the mapping information from the coordination tier, to access the metadata describing the binary data from one of the one or more of the storage nodes based on the mapping information, and to return the metadata describing the binary data in a response to the request.

20 Claims, 16 Drawing Sheets

Related U.S. Application Data

(60) Provisional application No. 62/357,817, filed on Jul. 1, 2016.

(51) Int. Cl.
*G06F 16/23* (2019.01)
*G06F 16/245* (2019.01)

(56) References Cited

U.S. PATENT DOCUMENTS

| | | | |
|---|---|---|---|
| 7,653,612 | B1 | 1/2010 | Veeraswamy et al. |
| 8,060,498 | B2 | 11/2011 | Fiero |
| 8,676,788 | B2 | 3/2014 | Charlet et al. |
| 8,838,595 | B2 | 9/2014 | Kesselman |
| 8,868,508 | B2 * | 10/2014 | Drobychev ............ G06F 16/27 707/640 |
| 9,058,407 | B2 * | 6/2015 | Guo ...................... G16H 40/20 |
| 9,621,428 | B1 | 4/2017 | Lev et al. |
| 10,264,071 | B2 | 4/2019 | Vincent |
| 2006/0248038 | A1 | 11/2006 | Kaplan et al. |
| 2009/0112808 | A1 | 4/2009 | Howcroft et al. |
| 2009/0187610 | A1 | 7/2009 | Guo |
| 2010/0269164 | A1 * | 10/2010 | Sosnosky ............ G06F 16/1794 707/E17.007 |
| 2011/0196828 | A1 * | 8/2011 | Drobychev ............ G06F 16/275 707/622 |
| 2011/0196900 | A1 | 8/2011 | Drobychev et al. |
| 2012/0066554 | A1 | 3/2012 | Ruiz |
| 2013/0311778 | A1 | 11/2013 | Cherukuri et al. |
| 2014/0108717 | A1 * | 4/2014 | Tian ....................... G06F 3/065 711/108 |
| 2016/0004734 | A1 * | 1/2016 | Naryzhny ............... G06F 16/22 707/736 |
| 2016/0088077 | A1 * | 3/2016 | Liu ..................... H04L 67/1095 709/203 |
| 2016/0352827 | A1 * | 12/2016 | Procopio ............ G06F 11/1458 |
| 2017/0154090 | A1 * | 6/2017 | Fang ................... H04L 67/1095 |
| 2018/0004745 | A1 | 1/2018 | Finkelstein et al. |
| 2018/0253359 | A1 * | 9/2018 | Zhang ................. G06F 11/1464 |

OTHER PUBLICATIONS

Vitess API Reference, Retrieved from the Internet: <URL:http://vitess.io/reference/vitess-api.html>, (Accessed Jul. 1, 2016), pp. 1-42.

Vitess: Servers and tools that scale MySQL databases for the web in cloud architectures or on dedicated hardware, Retrieved from the Internet: <URL: http://vitess.io/>, (Accessed Jul. 1, 2016), pp. 1-2.

Advisory Action Received for U.S. Appl. No. 15/638,952, mailed on May 18, 2020, 3 Pages.

Final Office Action Received for U.S. Appl. No. 15/638,952, mailed on Dec. 3, 2020, 14 pages.

Final Office Action Received for U.S. Appl. No. 15/638,952, mailed on Mar. 3, 2020, 12 pages.

First Action Interview Office Action Summary Received for U.S. Appl. No. 15/638,952, mailed on Sep. 16, 2019, 6 pages.

First Action Interview Pre-Interview Communication received for U.S. Appl. No. 15/638,952, mailed on Jun. 28, 2019, 6 pages.

Non Final Office Action Received for U.S. Appl. No. 15/638,952, mailed on Jun. 11, 2020, 14 Pages.

Notice of Allowance Received for U.S. Appl. No. 15/638,952, mailed on Feb. 19, 2021, 9 Pages.

\* cited by examiner

DISTRIBUTED STORAGE OF METADATA FOR LARGE BINARY DATA

RELATED APPLICATIONS

This application claims the benefit of priority to U.S. Non-Provisional application Ser. No. 15/638,952 filed Jun. 30, 2017 titled "Distributed Storage of Metadata For Large Binary Data" which claims the benefit of priority U.S. Provisional Application No. 62/357,817, titled "Distributed Storage Of Metadata For Large Binary Data," and filed Jul. 1, 2016, which are both hereby incorporated herein by reference in their entirety.

TECHNICAL FIELD

Embodiments of the present disclosure relate generally to data processing and, more particularly, but not by way of limitation, to distributed storage of metadata for large binary data.

BACKGROUND

In at least some large data storage systems, multiple client devices, or applications executing thereon, may access a particular set of binary data, along with its corresponding metadata. Such metadata may describe various aspects of the binary data, such as the size, structure, and other characteristics of the binary data. For example, the binary data may be image data of one or more photographs, while the metadata may indicate the size of the image data, the compression scheme employed to generate the image data, the date and/or time at which the image data was captured, a number of separate images included in the image data, a source of the image data, and so on.

In many large data storage systems carrying such data, the binary data may be stored as one or more sets of unstructured data, such as one or more binary large objects (BLOBs) in a data storage area separate from a database that stores the metadata associated with the binary data. In addition to the extra coordination and intelligence required of a client device to access the binary data and associated data separately, the client device is often expected to connect to and access the metadata database directly. This direct access may be problematic in the event of database failures, device failovers, service upgrades, and the like. Further, scaling the metadata database in response to changes in the overall amount of data stored, fluctuations in access activity, and so on, may be rather onerous and error-prone.

BRIEF DESCRIPTION OF THE DRAWINGS

The appended drawings merely illustrate example embodiments of the present disclosure, and thus do not limit the scope of the disclosure.

The headings provided herein are merely for convenience and do not necessarily affect the scope or meaning of the terms used.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1:
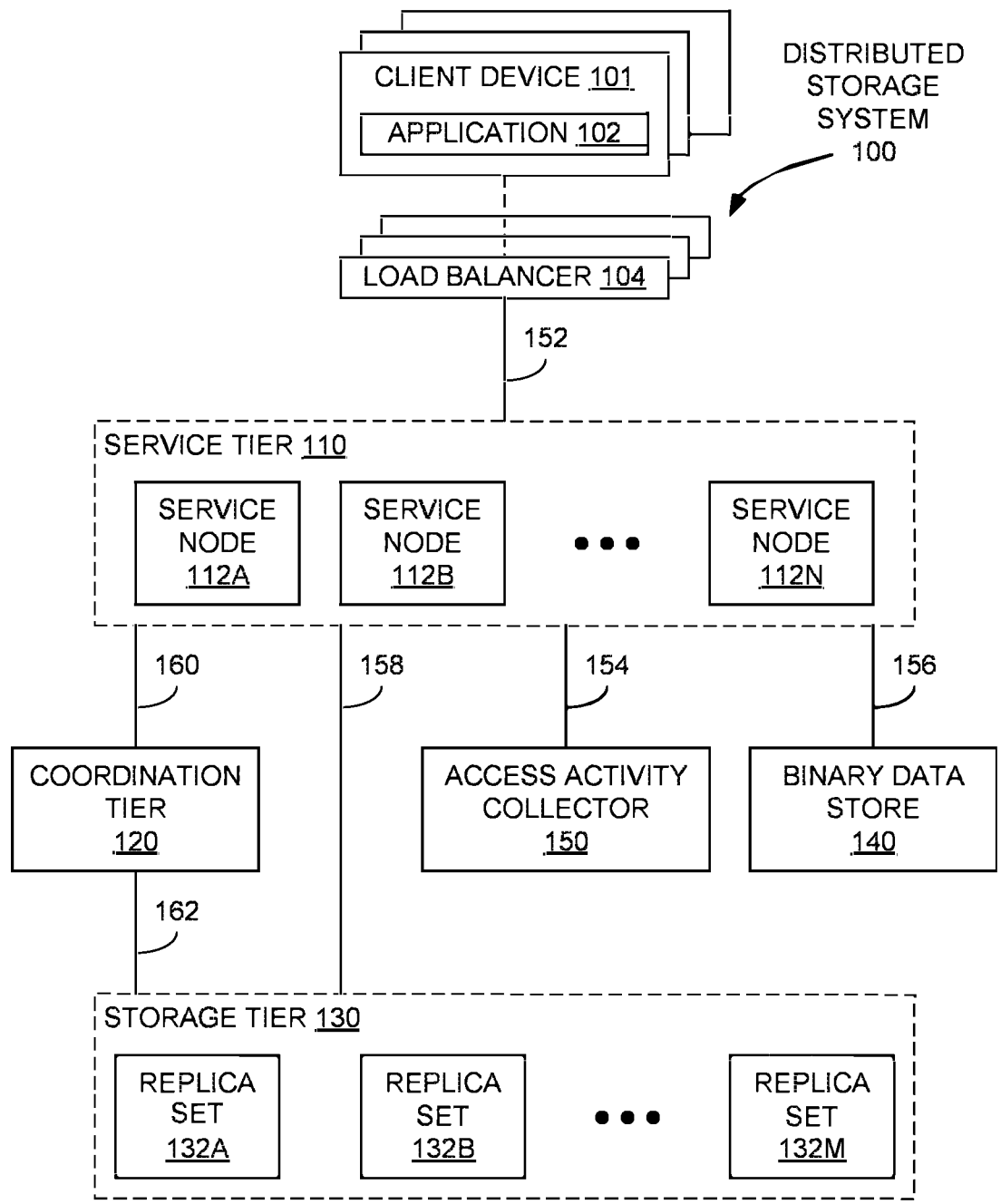
FIG. 1 is a block diagram of an example distributed storage system.

FIG. 1 is a block diagram of an example distributed storage system 100. The distributed storage system 100 may be configured to store data, as well as corresponding metadata describing the data, to be accessed by one or more applications 102 executing on one or more client devices 101. Example client devices 101 may include, but are not limited to, desktop computers, laptop computers, tablet computers, smart phones, smart televisions, streaming devices, gaming systems, and so on. The client device 101, in an example embodiment, may communicate with the distributed storage system 100 by way of a network, such as a wide area network (WAN) (e.g., the Internet), a local area network (LAN), a cellular data network (e.g., a 3G (third-generation) or 4G (fourth-generation) network), another type of network or communication connection, and/or some combination thereof. Additionally, the client device 101 may be communicatively coupled with the distributed storage system 100 via a plurality of intermediate devices not explicitly illustrated in FIG. 1.

The application 102 may be, for example, a web browser configured to post data to, or access data stored in, the distributed storage system 100. In another example embodiment, the application 102 may be a programmatic client program configured to interact with an application programming interface (API) provided by the distributed storage system 100 to post data to, and/or access data stored in, the distributed storage system 100. Examples of the stored data may include image data, video data, audio data, textual data, and so forth.

As illustrated in FIG. 1, the distributed storage system 100 may include a service tier 110, a coordination tier 120, and a storage tier 130, along with a binary data store 140, an access activity collector 150, and possibly one or more load balancers 104. In an example embodiment, the load balancer 104 may receive requests 152 to post or access data on the distributed storage system 100 and direct those requests 152 to a particular service node 112 of the service tier 110. The load balancer 104 may direct the requests 152 based on the current workload of each of the service nodes 112, a volume of communication traffic being handled by each of the service nodes 112, a geographic location of each of the service nodes 112 relative to the location of the client device 101 issuing the request, and the like. In some example embodiments, a request 152 may include binary data (or primary data), as well as metadata that describes one or more aspects or characteristics of the binary or primary data. As is described in greater detail below, the request may refer to a "logical object" (e.g., by way of a logical object identifier or name) that logically references an item of binary data and its associated metadata. In example embodiments, the request 152 may be a Hypertext Transfer Protocol (HTTP) request complying with a representational transfer state (REST) architecture associated with the World Wide Web (WWW). In addition, the request 152 may include a data payload (e.g., data to be written to the storage tier 130) in JavaScript Object Notation (JSON) format. However, requests employing other communication protocols or software architectures may be employed in other example embodiments.

In at least some example embodiments, the service nodes 112A, 112B, . . . , 112N (alternatively, service nodes 112), which may be individual computers or servers, or individual instances executing on virtual computing systems, receive the data requests 152 from the client devices 101 (e.g., via the one or more load balancers 104), transform or translate those requests 152 into binary or primary data requests 156 and/or metadata requests 158. The binary data requests 156 may be directed to the binary data store 140, which may be configured to store one or more different types of binary data. The metadata requests 158 may be directed to a particular device or system of the storage tier 130 for processing. To perform the transformation of the requests 152, as well as to determine the particular system or device to which the resulting metadata requests 158 are to be sent, the service node 112 processing the request may access the coordination tier 120, which may provide information 160 identifying the particular system or device of the storage tier 130 that stores the requested metadata, or to which the metadata is to be stored. The coordination tier 120 is discussed in greater depth below with regard to FIG. 6.

The service tier 110 may also record various operations it has undertaken, as well as the result of those operations, to the access activity collector 150 in real-time, or in near-real-time. The access activity collector 150 may record those operations and/or results in a log to enable various administrative tasks. In an example embodiment, the access activity collector 150 may record read operations involving primary or binary data (e.g., BLOBs) stored in the binary data store 140. Such information may be employed by an administrative agent or other entity of the distributed storage system 100 to detect inactive data objects for possible migration to a low-cost tenant. In example embodiments, each recorded access event may be recorded by way of an identifier for the data object and an access time. Using these particular recorded events, the access activity collector 150 may also receive and respond to queries regarding inactive data objects stored the binary data store 140 (e.g., those data objects that have not been accessed since some particular point in time). In response to such a query, the access activity collector 150 may respond with a list of identifiers for the data object stored in the binary data store 140 that match those criteria.

The storage tier 130, to promote redundancy and resilience to device or system failures, may store multiple replica sets 132A, 132B, . . . , 132M (alternatively, replica sets 132), with each replica set 132 including multiple copies of a particular set of data. Each replica set 132 may be copied across multiple data storage devices and geographic areas, thus promoting fault tolerance, high availability, and low access latency across multiple geographic locations or regions. In some example embodiments, the storage tier 130 may provide and update information regarding the location of various data items or objects stored therein to the coordination tier 120, which may then be employed by the service tier 110, as described above. The storage tier 130 may include one or more storage nodes, which may be individual computers or servers, or instances executing on virtual computing systems, with data storage devices or systems that store the replica sets 132. The storage tier 130, the replica sets 132, the storage nodes and related topics are described more fully below in conjunction with FIG. 2 through FIG. 5.

Based on at least some of the example embodiments described herein, the distributed storage system 100, by way of its separation of the service tier 110 from the storage tier 130, the actions of which are coordinated via the coordination tier 120, facilitates the decoupling of the client devices 101 from the actual storage devices of the storage tier 130. This decoupling relieves the client devices 101 of the burden of directly tracking the location of desired data within the storage tier 130, the types of databases or storage devices being used to store the data, and other implementation details. Further, this decoupling allows the client device 101 to employ the service tier 110 to access the binary or primary data and its associated metadata in tandem via a single request, even though the primary data and its metadata may be stored in separate devices, systems, or locations, to facilitate efficient, fault tolerant, scalable storage with low overall access latency. Other potential aspects or characteristics of the distributed storage system 100 may be determined from the discussion of the various example embodiments discussed herein.

Figure 2:
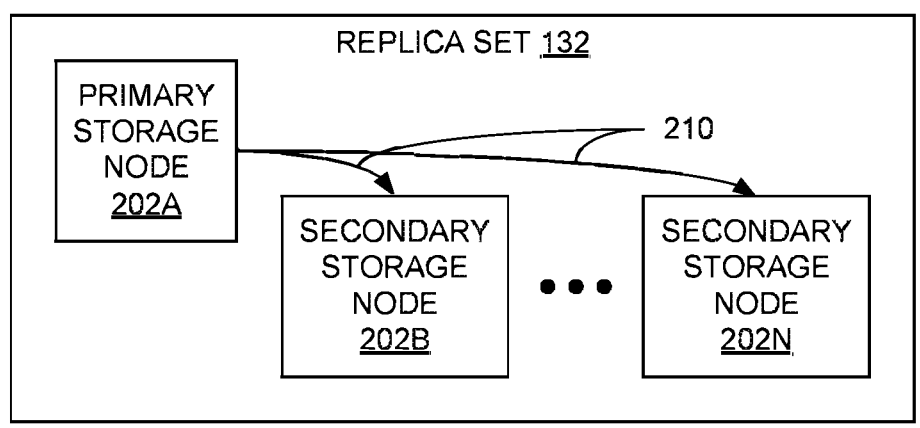
FIG. 2 is a block diagram of an example set of storage nodes of the distributed storage system of FIG. 1.

FIG. 2 is a block diagram of an example set of storage nodes 202 associated with a replica set 132 of the storage tier 130 of the distributed storage system 100 of FIG. 1. A primary storage node 202A holding a copy of a replica set 132 may provide replication messages or operations 210 to each of one or more secondary storage nodes 202B through 202N so that each secondary storage node 202B through 202N may hold a copy of the replica set 132. In an example embodiment, a service node 112 may direct write operations involving the replica set 132 to the primary storage node 202A, but may direct read operations involving the replica set 132 to any of the storage nodes 202 (e.g., the primary storage node 202A, or any of the secondary storage nodes 202B through 202N).

In example embodiments, one or more of the storage nodes 202 may contain copies of more than one replica set 132, and one or more of the replica sets 132 of the storage tier 130 may be stored across different sets of the storage nodes 202. For example, copies of a first replica set 132A may be stored at storage nodes 202A (primary), 202C (secondary), and 202D (secondary), while copies of a second replica set 132B may be stored at storage nodes 202B (primary), 202C (secondary) and 202E (secondary). Consequently, the same storage node 202 may serve as a primary storage node 202A for one replica set 132 and as a secondary storage node 202B for another replica set 132. Additionally, in at least some example embodiments, storage nodes 202 and/or replica sets 132 may span more than one "availability area." Any two availability areas are unlikely to be rendered faulty or inoperative simultaneously, such as due to the same fault or error source. More information regarding replica sets 132 and their association with storage nodes 202 is presented below in connection with FIG. 4.

Figure 3:
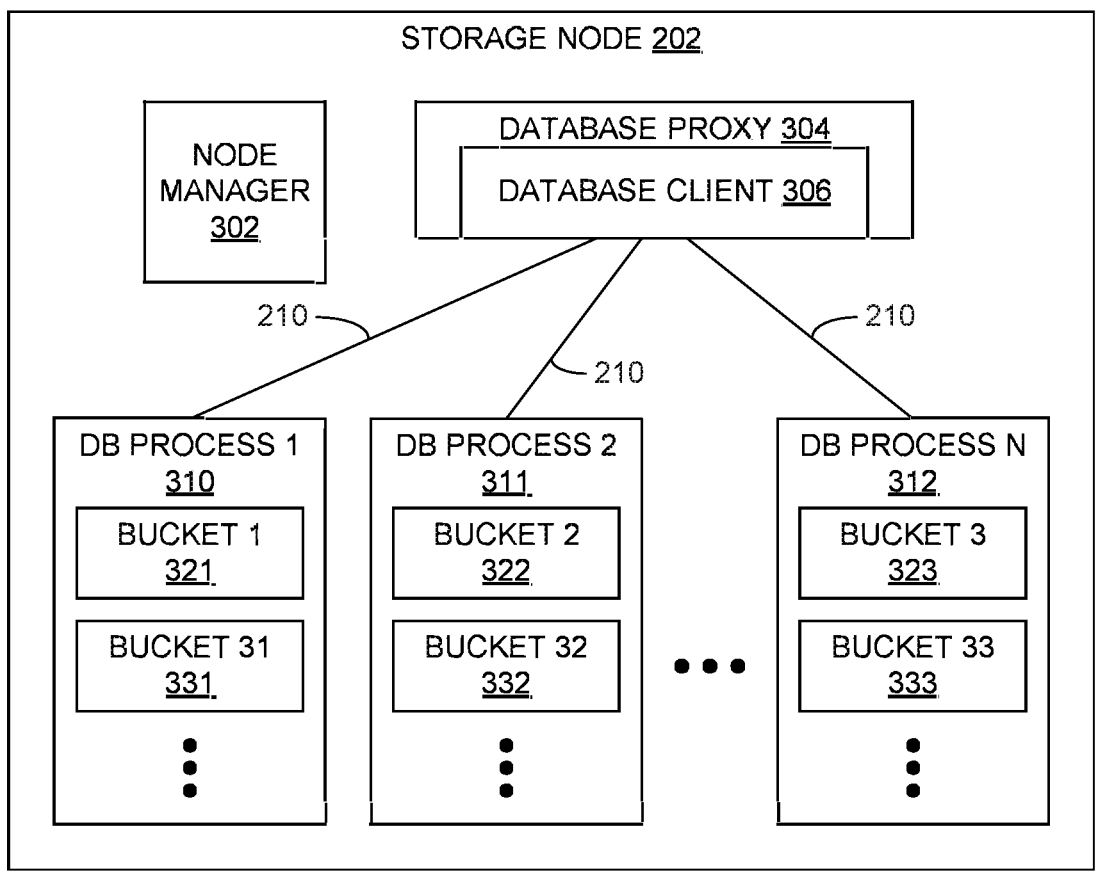
FIG. 3 is a block diagram of an example storage node of the set of storage nodes of FIG. 2.

FIG. 3 is a block diagram of an example storage node 202 of the set of storage nodes 202 of FIG. 2. The storage node 202 may include, in some example embodiments, a node manager 302, a database proxy 304 associated with a database client 306, and a plurality of database processes 310 through 312. The database processes 310-312 may be independent instances of a database management system (DBMS), each with its own execution environment (e.g., virtual memory and other execution resources), that may execute simultaneously or concurrently. Each of the database processes 310 may be responsible for the storage and query of one or more partitions or "buckets" of one or more copies of replica sets 132. In the example of FIG. 3, a first database process 310 operates on buckets 321, 331, and so on; a second database process 311 operates on buckets 322, 332, and so on; and an nth database process 312 operates on buckets 323, 333, and so on. In an example embodiment, each of the database processes 310-312 may be capable of exposing its own change stream (e.g., a list of database change operations executed by the database process) for recording in an operation log to facilitate data replication within the associated replica set 132.

The database proxy 304 may be configured to receive a request 158 from a service node 112, as indicated above. In addition, the database proxy 304 may minimize the number of client connections to a particular database process 310-312. In some example embodiments, the request may be a REST-compliant HTTP request, as indicated above for requests 152 received by the service tier 110, but possibly with a different payload associated with a particular database. In one example embodiment, the payload may be in BSON (Binary JSON) format, as is employed in the MongoDB® open-source document-oriented database. However, other formats for the request 158 and corresponding payload may be employed in other example embodiments.

The database proxy 304, by way of its associated database client 306, may transform the request 158 into the native format of the database process 310-312 receiving the request 158. The database proxy 305 and client 306 may also determine the correct database process 310-312 to receive the request 158 based on a replica set 132 name, bucket 311-333 name, and/or database name indicated in the request 158 from the service node 112. In some example embodiments, the storage node 202 may include more than one database proxy 304 and database client 306, such as one database proxy 304 and associated database client 306 per database process 310-312 executing on the storage node 202.

The node manager 302 may be configured to manage one or more administrative tasks on its corresponding storage node 202. Such tasks may include, in some example embodiments, compacting one or more buckets 311-333 to free up unused space in the memory containing the bucket, splitting one or more buckets into multiple buckets 311-333 to maintain buckets of relatively even size, facilitating re-execution or replay of operations stored in a database operation log of a database process 310-312 (e.g., for data replication tasks), and facilitating migration of one or more artifacts (e.g., a file system directory) of one or more buckets 311-333 from one replica set 132 to another.

Figure 4:
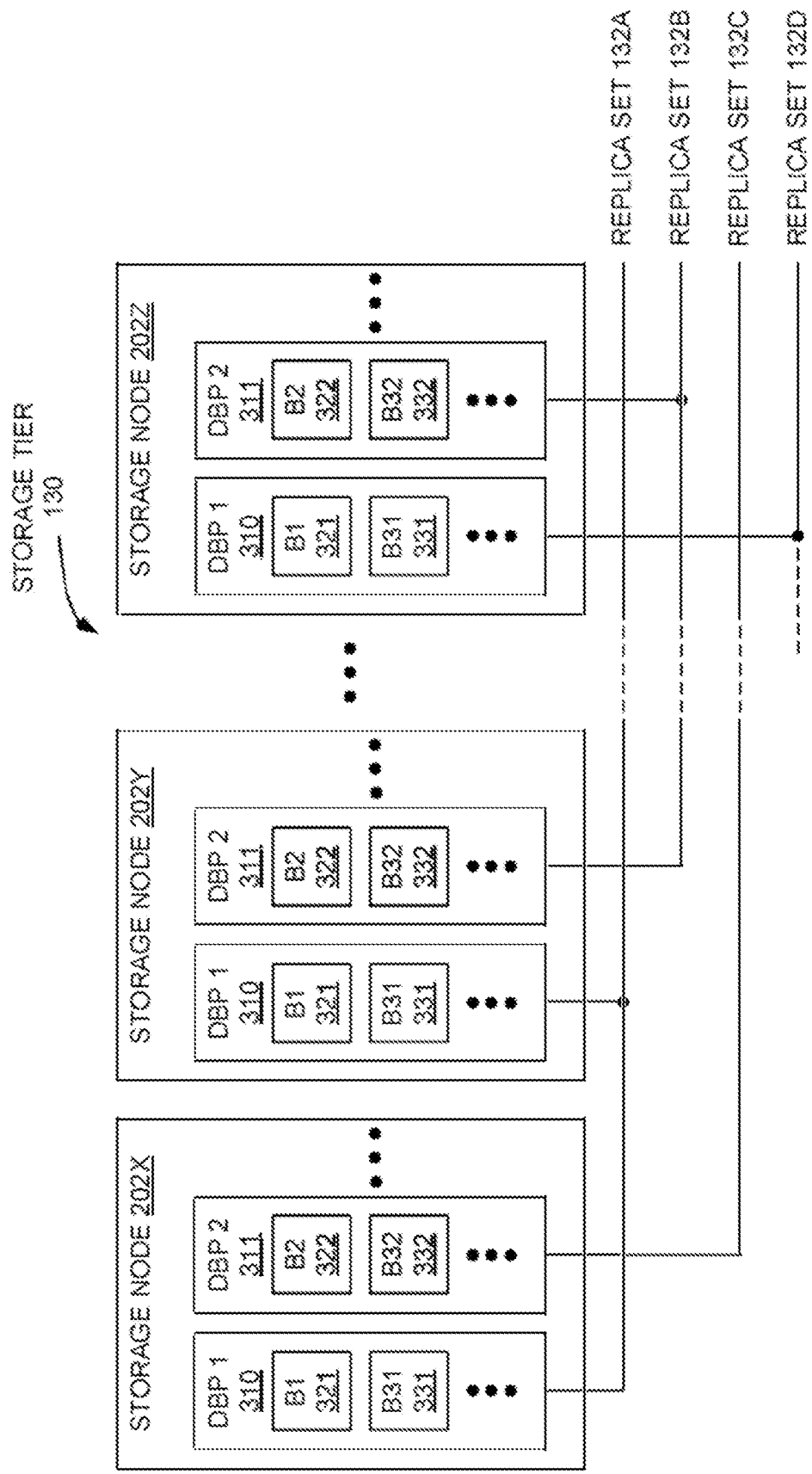
FIG. 4 is a block diagram of an example set of storage nodes storing multiple replica sets of the distributed storage system of FIG. 1.

FIG. 4 is a block diagram of an example set of storage nodes 202 storing multiple replica sets 132 of the distributed storage system 100 of FIG. 1. In this particular example, each of the storage nodes 202 includes at least one copy or "member" of multiple different replica sets 132. More specifically, one member of replica set 132A is stored at a first storage node 202X via a first database process 310 therein while another member of the replica set 132A is stored at a second storage node 202Y via its first database process 310. At the same time, one member of replica set 132B is stored at the second storage node 202Y via a second database process 311 while another member of the replica set 132B is stored at a third storage node 202Z via its second database process 311. One member of replica set 132C is stored at the first storage node 202X via its second database process 311, and one member of replica set 132D is stored at the third storage node 202Z via its first database process 310. Other storage nodes 202 not explicitly shown in FIG. 4 may store copies of these replica sets 132A through 132D as well. As a result of the arranging of the replica sets 132 as indicated, the replica sets 132 may be distributed across availability areas, presuming each of the storage nodes 202 occupies a separate availability area, thus maintaining access to each replica set 132 in the event of a storage node 202 failure. Moreover, as mentioned above, one or more of the storage nodes 202 may be located across availability areas as well.

Figure 5:
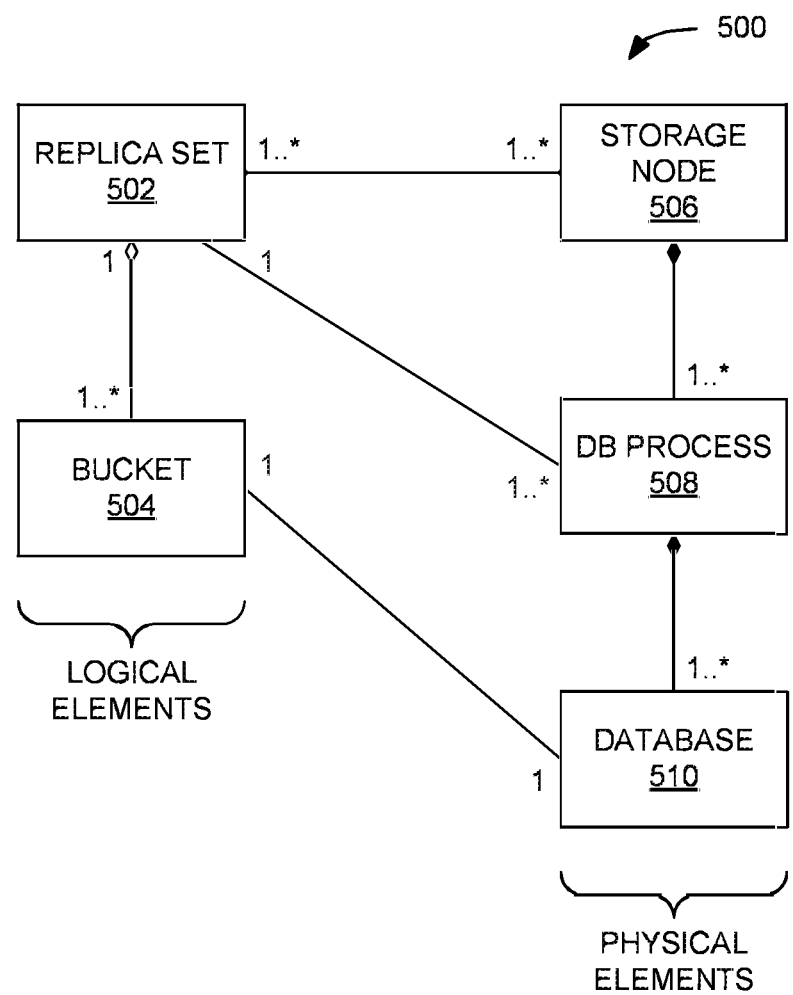
FIG. 5 is a data model of an example replica set and included buckets of metadata for storage in a plurality of storage nodes of the distributed storage system of FIG. 1.

FIG. 5 is a data model 500 of an example replica set 502 (corresponding to the replica sets 132 of FIG. 1) that includes buckets 504 of metadata for storage in a plurality of storage nodes 506 (corresponding to the storage nodes 202 of FIG. 4). The data model 500 graphically explains how the logical elements of the replica set 502 and its associated buckets 504 may relate to the physical elements of storage nodes 506, database processes 508, and individual databases 510, as employed in the example embodiments discussed herein. Consequently, the data model 500 describes how the data of each replica set 502 is divided into "shards," or horizontal partitions of database data. This division of data may enhance tolerance of hardware and/or software failures that would otherwise lead to data loss, as well as facilitate scaling of the system with limited performance impact.

A replica set 502 may be viewed as a logical group of identical copies or members of data. In the data model 500, each member or copy in the replica set 502 may include one or more buckets 504, which represent the smallest data shard definable. At any point in time, a particular bucket 504 belongs to a single replica set 502. However, a bucket 504 may be migrated from one replica set 502 to another to equalize load on a storage node 506. Each bucket 504 may be realized through a single database 510 executing in a database process 508. Each database process 508 may manage one or more databases 508, and one or more database processes 508 may execute on a single storage node 506. Further, each replica set 502 may be bound to one or more storage nodes 506. Each replica set 502 includes a primary copy or member and one or more secondary members, each of which may be managed by a separate database process 508. In some example embodiments, all write or update operations are to be performed by the database process 508 managing the primary member, while read operations may be served by one of the database processes 508 managing a primary or secondary member. In some example embodiments, read operations involving secondary members may be allowed only if a live view of the replica set 502 is not mandated for that particular read operation.

The data of the member may be apportioned among the buckets 504 in a number of ways. In one example embodiment, a numeric logical object identifier employed to reference a data item may be hashed to determine which bucket 504 of a replica set 502 contains, or will contain, the metadata for the data item. Other example embodiments not explicitly discussed herein may employ range partitioning (e.g., apportioning non-overlapping ranges of the logical object identifier to specific buckets 504) or some combination of hash partitioning and range partitioning.

Figure 6:
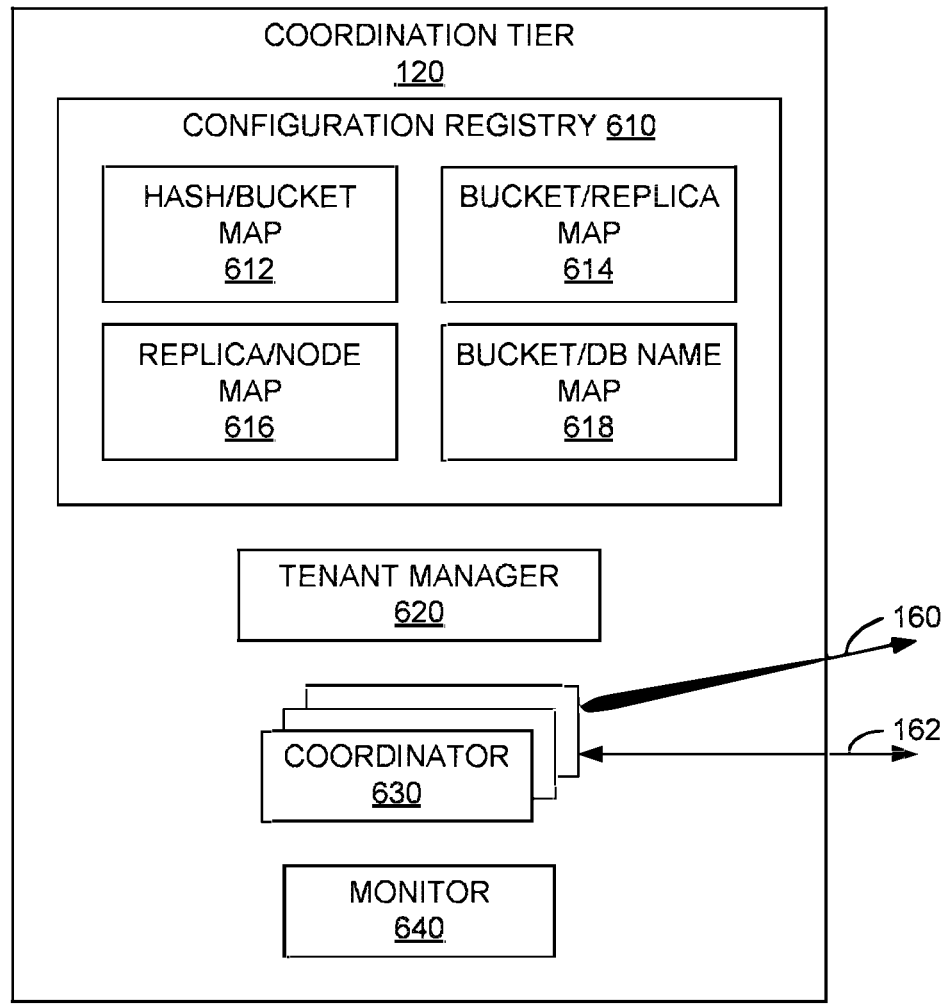
FIG. 6 is a block diagram of an example coordination tier of the distributed storage system of FIG. 1.

FIG. 6 is a block diagram of an example coordination tier 120 of the distributed storage system 100 of FIG. 1. In this example embodiment, the coordination tier 120 may include a configuration registry 610, a tenant manager 620, one or more coordinators 630, and a monitor 640. In some example embodiments, the configuration registry 610 may be stored in a memory of one or more computing systems, while the tenant manager 620, the coordinators 630, and the monitor may be modules including hardware, firmware and/or software executing on one or more hardware processors, or some combination thereof. Other modules may be included in the coordination tier 120, but are not explicitly described herein to simplify and focus the following discussion.

The configuration registry 610 may include several maps describing the organization of data items or logical objects (denoted by way of their individual identifiers) within the storage tier 130 to facilitate access to the logical objects by the service tier 110. In the example embodiment of FIG. 6, the configuration registry 610 includes a hash/bucket map 612, a bucket/replica map 614, a replica/node map 616, and a bucket/database name map 618. The hash/bucket map 612 relates each logical object identifier hash to a particular bucket 504 identifier. In other example embodiments, a cluster/bucket map or range/bucket map may be employed instead of the hash/bucket map 612 in systems in which logical objects are mapped to buckets by way of ranges or clusters or logical object identifiers instead of hashes of those identifiers. The bucket/replica map 614 associates each bucket 504 identifier with its associated replica set 502 identifier. The replica/node map 616 associates an identifier for each replica set 502 member to both an identifier for the storage node 506 and an identifier for the database process 508 instance executing within the identified storage node 506. The bucket/database name map 618 associated each bucket 504 with a name of a database provided access to metadata stored in the bucket 504.

The one or more coordinators 630 may be configured to communicate with the service nodes 112 of the service tier 110 via messages 160 and with the storage nodes 202 of the storage tier 130 via messages 162. In some example embodiments, multiple coordinators 630 may be employed to facilitate redundancy or operational bandwidth for the operations ascribed to the coordinators 630. In an example embodiment, a coordinator 630 may receive a message 160 indicating an identifier of a logical object to be accessed. In response, the coordinator 630 may consult one or more of the maps 612-618 of the configuration registry 610 to determine the identifiers for the storage node 506, database process 508, and bucket 504 corresponding to the logical object to be accessed. In some example embodiments, the service node 112 receiving the information returned by the coordinator 630 may cache that information locally so that it may be reused by the service node 112 for future logical object accesses.

In an example embodiment, a coordinator 630 may receive a message 162 to update one or more of the maps 612-618 of the configuration registry 610 based on information provided within the message 162. In response, the coordinator 630 may update the one or more maps 612-618 accordingly, and may inform one or more of the service nodes 112 that access the coordination tier 120 of the map changes, possibly so that the service nodes 112 may invalidate their local map information caches. The one or more coordinators 630 may also perform additional tasks not specifically delineated herein.

The tenant manager 620 may be configured to manage the number of buckets 504 of storage allocated to each tenant of the distributed storage system 100. In some example embodiments, each tenant may include one or more users, client devices 101, and/or applications 102 that have access to a particular set of logical objects stored in the storage tier 130. Those that possess such access may belong to the same organization or group of organizations (e.g., one or more related corporations). The tenant manager 620 may manage the number of buckets 504 for each tenant (e.g., by adding or subtracting buckets 504 from the storage tier 130) based on one or more factors, such as history of data usage within the storage tier 130, future expected levels of data usage within the storage tier 130, explicitly requested amounts of data to be stored in the storage tier 130, and so forth. During the adding or subtracting of buckets 504, the tenant manager 504 may generate the corresponding mapping information in the maps 612-618 of the configuration registry 610. The tenant manager 620 may also add new tenants to, or remove tenants from, the distributed storage system 100, react to changes in the availability of one or more storage nodes 506 in the storage tier 130, and so on. To facilitate changes in the number of buckets 504 assigned to a tenant, or other changes involving the data storage ascribed to a tenant in the storage tier 130, the tenant manager 620 may communicate through coordinators 630 via messages 162 to cause the storage nodes 506 to make changes determined by the tenant manager 620, and to update the configuration registry 610 accordingly. The tenant manager 620 may perform additional duties not specifically described above in some example embodiments.

The monitor 640 may be configured to monitor various aspects of the coordination tier 120, such as the operation of the coordinators 630 and the tenant manager 620. In some example embodiments, the monitor 640 may detect hardware or software faults, data inconsistencies (e.g., inconsistencies among the maps 612-618 of the configuration registry 610), relatively high latencies in the operation of the coordinators 630, and the like. In an example embodiment, the monitor 640 may control or adjust the number of active coordinators 630 dynamically in reaction to coordination activities, such as activities related to communications between the coordination tier 120 and both the service tier 110 and the storage tier 130 (e.g., via messages 160, 162). In the case of a hardware or software fault or other condition not directly addressable by the monitor 640, the monitor 640 may alert system operators or other personnel regarding the detected condition. The monitor 640 may perform other operations relating to monitoring, maintenance, and related activities for the coordination tier 120 in other example embodiments.

Figure 7:
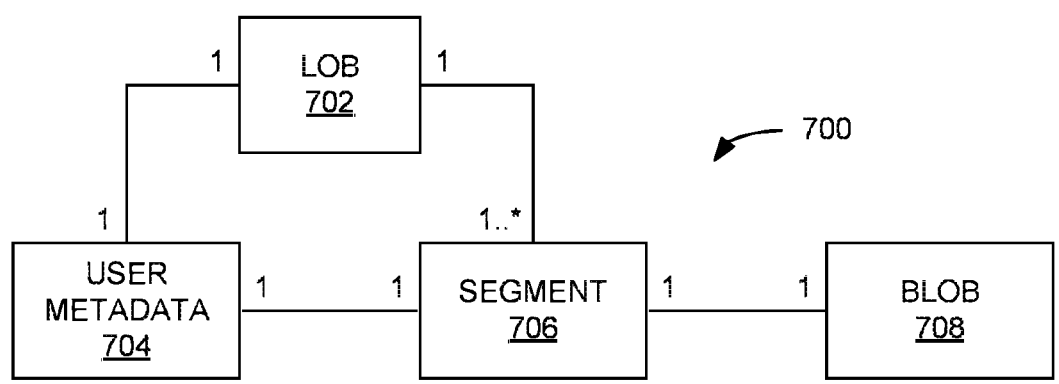
FIG. 7 is a data model of an example logical object including binary data and associated metadata to be stored in the distributed storage system of FIG. 1.

FIG. 7 is a data model 700 of an example logical object (LOB) 702 including binary data and associated metadata to be stored in the distributed storage system 100 of FIG. 1. In the particular example embodiment of FIG. 7, the logical object 702 is associated with a particular set of user metadata 704 stored in the storage tier 130 as well as with one or more segments 706, each of which is associated with separate binary data stored in the binary data store 140. Each segment 706 may include further metadata, as well as a single reference to a separate binary large object (BLOB) 708 described by the user metadata 704. In other words, the logical object 702 may reference each of one or more separate segments or portions of binary data stored in the binary data store 140 as separate binary large objects 708. In at least some example embodiments, the logical object 702 may be identified by a numeric value that is associated with both the user metadata 704 and the binary data segments 706. In an example embodiment, the one or more BLOBs 708 may include image data, while the corresponding user metadata 704 may provide information describing the image data, such as, for example, image resolution, date and/or time of capture of the image data, the format of the image data, a user associated with the image data, a particular item for sale associated with the image data, and/or the like. In example embodiments, the one or more BLOBs 708 may include other types of media data, such as video or audio data.

Figure 8:
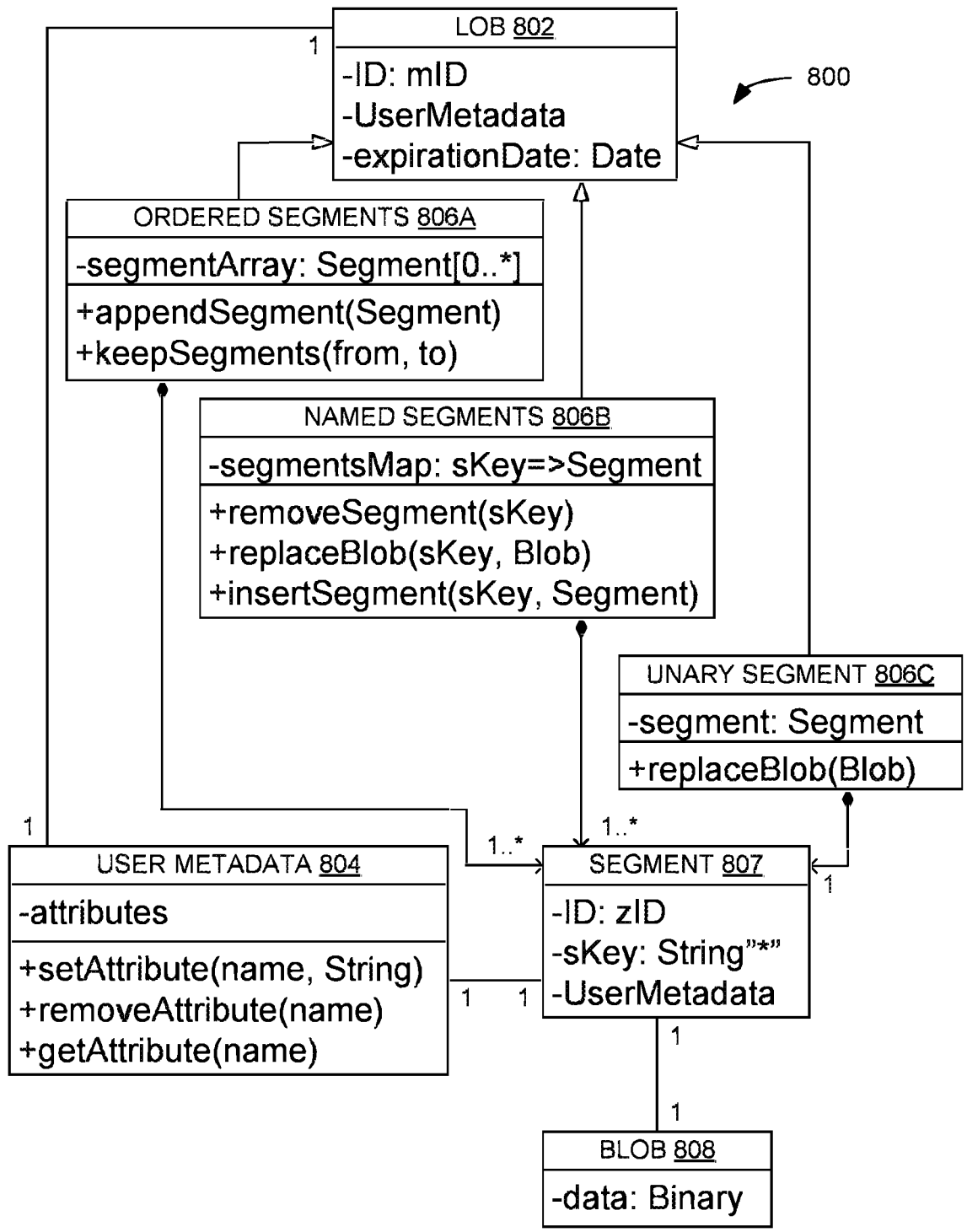
FIG. 8 is a data model of another example logical object including binary data and associated metadata to be stored in the distributed storage system of FIG. 1.

FIG. 8 is a data model of a more specific example logical object 802 including binary data and associated metadata based on the logical object 702 of FIG. 7. In this example embodiment, the logical object (LOB) 802 is identified by way of an identifier (ID) serving as a database primary key (denoted as mID). Also associated with the logical object 802 may be a set of user metadata 804 (UserMetadata), and possibly an expiration date (expirationDate) upon which the logical object may be deleted from the distributed storage system 100.

The user metadata 804 may include a set of name-value pairs (attributes), and may provide a number of methods or functions accessing the metadata 804, such as via the service nodes 112 of the service tier 110. In the example embodiment of FIG. 8, the methods may include a setAttribute method that takes an attribute name (name) and a character string value of that attribute (String) as input to store the provided name-value pair as a portion of the user metadata 804. In some example embodiments, the setAttribute method will insert a new attribute in the user metadata 804 if an attribute having the same name does not already exist in the user metadata 804, while the method replaces the value with the provided value if an attribute of the same name already exists in the user metadata 804. A removeAttribute method may take an attribute name (name) as input, and remove the corresponding name-value pair from the user metadata 804. A getAttribute method, upon receiving an attribute name (name) of a name-value pair, may return the value associated with that name. Other access functions involving the user metadata 804 are also possible.

As indicated in FIG. 7, each of one or more segments 706 of a logical object 702 may include additional user metadata and a reference to a single binary large object 708. In the particular example embodiment of FIG. 8, the logical object 802 may employ one of three segment types: ordered segments 806A, named segments 806B, or a unary segment 806C. A segment 807 of each segment type 806A-806C may include metadata for its corresponding binary large object 808. That metadata may include an identifier (ID) serving as an large object identifier (denoted as zID) for the binary large object 808 as stored in the primary data store 140. In some example embodiments, the segment 807 metadata may also include a logical key (sKey) that is an identifier for a binary large object 808 if the logical object 802 includes multiple segments 807. Use of this logical key may be optional for ordered segments 806A, as a client device 101 may employ the known position of the segment 807 within a list of ordered segments 806A to reference the desired segment 807 and its corresponding binary large object 808. The sKey may also be unnecessary for a unary (single) segment 806. As mentioned above, the segment 807 may also include its own user metadata specific to its binary large object 808.

For a set of ordered segments 806A, the metadata of each segment 807 described above may be listed in an array (segmentArray). Each of the segments 807 may be referenced by a position or index ranging from zero to one less than the number of segments 807. Methods provided to access the set of ordered segments 806A may include an appendSegment method that receives the metadata of a new segment 807, which is appended as the last of the array of ordered segments 806A. A keepSegments method may receive a starting index (from) and an ending index (to) of the segment Array, and respond by removing all other segments 807 from the logical object 802. Other methods for accessing or manipulating the ordered segments 806A are also possible. To access a particular segment 807 of the ordered segments 806A, the client device 101 may only need to read the segmentArray directly to obtain the object identifier zID associated with desired segment 807 of the logical object 802 and access the corresponding binary large object 808 from the binary data store 140.

For a set of named segments 806B, the metadata of each segment 807 described above may be accessed by way of a segment map (segmentsMap) that maps each sKey to its corresponding segment 807. Methods provided to access the named segments 806B may include a removeSegment method that receives an sKey as input and removes the segment 807 identified with the sKey from the logical object 802. A replaceBlob method may receive an sKey and associated binary large object 808 as input, and in response replace the binary large object 808 currently associated with the input sKey with the input binary large object 808. Also, an insertSegment method may provide an sKey and a segment 807 as input, and may add the input sKey and segment 807 to the segmentsMap. In some example embodiments, the client device 101 may access a particular binary large object 808 of the logical object 802 by accessing the segmentsMap using the corresponding sKey to obtain the desired segment 807.

For a unary segment 806C, the metadata of the segment 807 may be accessed directly by the client device 101, thus obtaining the object identifier zID directly via the user metadata 804. In some example embodiments, a replaceBlob method may receive a binary large object 808 as input and replace the binary large object 808 identified by the object identifier zID with the input binary large object 808 in the binary data store 140.

FIG. 9 through FIG. 12 are flow diagrams of various methods executable within the distributed storage system 100 of FIG. 1. However, other systems aside from the particular distributed storage system 100 described herein may perform the same or similar operations depicted in FIGS. 9-12 in other embodiments.

Figure 9:
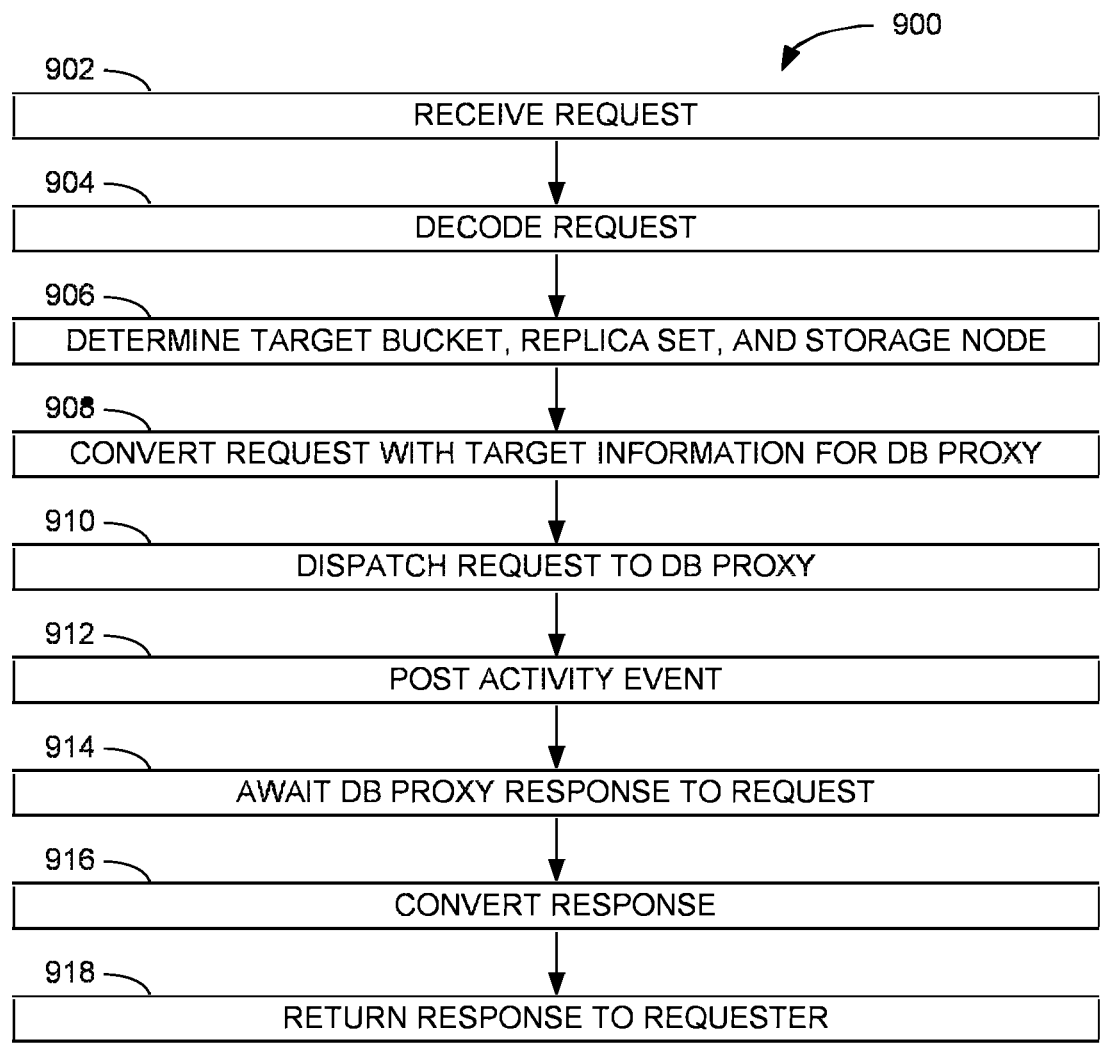
FIG. 9 is a flow diagram of an example method of processing a logical object request in the distributed storage system of FIG. 1.

FIG. 9, for example, is a flow diagram of an example method 900 of processing a logical object request received at a service node 112 from a client device 101. In the method 902, the request (e.g., an HTTP/REST invocation) is received at the service node 112 (operation 902) and decoded therein (operation 904). In an example embodiment, the request includes a logical block identifier (mID).

The service node 112 may then determine the particular target bucket 504, replica set 502, and/or storage node 506 to which the request should be directed for servicing (operation 906). To determine this information, the service node 112, in an example embodiment, may hash the logical block identifier using a predetermined hashing algorithm to generate a corresponding hash h with an output range of 0 to LONG_MAX. The service node 112 may then compare the hash h with hash values listed in the hash/bucket map 612 to determine the correct bucket 504 associated with the logical block identifier. In an example embodiment, each bucket 504 is associated with N randomly-chosen values (hash) from 0 to LONG_MAX at the time the bucket 504 is created (e.g., by the tenant manager 620), and all values for all buckets 804 are arranged or sorted logically in increasing order in a data structure in the hash/bucket map 612, with each value (hash) being associated with its corresponding bucket 504 identifier. If the value of the hash h is greater than or equal to a particular hash (hash) in the hash/bucket map 612, and less than the next-highest hash in the map 612, the logical object corresponding to the logical object identifier in the request is located in the bucket 504 associated with the particular hash in the map 612. Based on the identified bucket 504, the corresponding replica set 502 may be determined from the bucket 504 identifier by way of the bucket/replica map 614, the correct storage node 506 and database process instance 508 may be determined using the replica set 502 identifier via the replica/node map 616, and the database 510 may be determined using the bucket 504 identifier via the bucket/database name map 618.

The service node 112 may then convert the received request using the retrieved information (e.g., bucket 504 identifier, replica set 502 identifier, and so on) into a database request (e.g., an HTTP/REST invocation with a BSON payload, as mentioned above) (operation 908) and dispatch the converted request to the database proxy 304 (operation 910). The service node 112 may also post the request as an activity event to the access activity collector 150 (operation 912), possibly while the service node 112 awaits a response to the request (operation 914). Upon receipt of the response, the service node 112 may convert the response to a format acceptable to the client device 101 that generated the original request (operation 916) and return the converted response to the requesting client device (operation 918).

In some example embodiments, the request received by the service node 112 may be associated with a post request to store binary data to the binary data store 140. The binary data may be stored in one or more files, each including data for binary large objects 808 for one or more segments 807 of a logical object 802. Consequently, the service node 112 may first store the binary data by loading the files to the binary data store 140, receive the associated binary large object identifier (zIDs), and then store the zIDs in the metadata of the segments 807 of the logical object 802 being updated to the storage tier 130 in response to the received request.

In an example embodiment, the service node 112 may facilitate requests from the client device 101 for separate metadata and binary data access operations. Consequently, the client device 101 or a component of the distributed storage system 100 may fail to associate a binary large object 808 of the binary data store 140 with a logical object 802, resulting in an "orphan" BLOB 808. To address this possibility, the service node 112 may generate separate events related to a binary large object 808 to the access activity collector 150: a "BLOB Created" event indicating a binary large object identifier (zID) and a creation time for the binary large object 808, and a "BLOB bound" event noting the zID when the binary large object 808 is bound to its logical object 802 in the storage tier 130. A subsequent scan of the recorded events in the access activity collector 150 may then reveal any binary large objects 808 stored in the binary data store 140 that have not been bound to a logical object 802 within some predetermined orphan lifetime value (e.g., if an unbound binary large object 808 has existed longer than the orphan lifetime value, based on the length of time that has passed since the creation time).

In another example embodiment, one or more components of the distributed storage system 100 (e.g., a service node 112, the tenant manager 620, and/or another device or system) may record the binary large object identifiers (zIDs) stored in associated with logical objects 802 in the storage tier 130 and zIDs of binary large objects 808 stored in the binary data store 140, and compare the two sets of zIDS to determine if any orphan binary large objects 808 exist in the binary data store 140.

Figure 10:
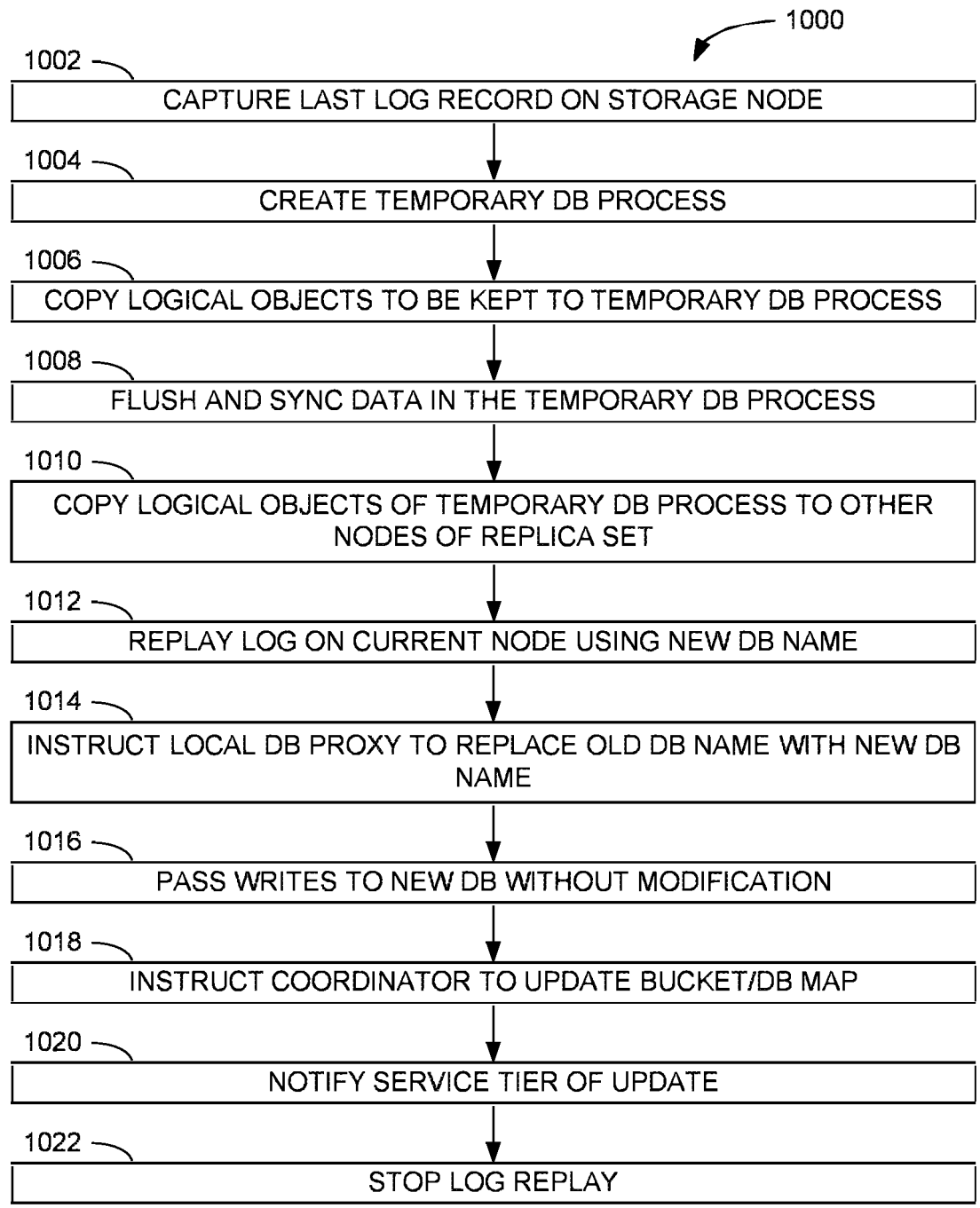
FIG. 10 is a flow diagram of an example method of bucket compacting in the distributed storage system of FIG. 1.

FIG. 10 is a flow diagram of an example method 1000 of bucket compacting in the distributed storage system 100 of FIG. 1. The method 1000 may be performed, in some example embodiments, by the node manager 302 or the coordination tier 120 to reduce the overall memory footprint of logical object 802 data in the storage tier 130 by removing expired logical objects 802, logical objects 802 explicitly marked for deletion, and/or so on. Prior to the method 1000, a sorted list of identifiers (mIDs) of expired or deleted logical objects 802 may be provided to each storage node 506 in the replica set 502 in which compaction is to occur.

In the method 1000, the last operation log record on the storage node 506 may be captured (operation 1002). In example embodiment, the operation log may store operations performed on a primary copy of a replica set 502 so that those operations may be repeated on a secondary copy of the replica set 502, as described earlier. A new temporary standalone database process 508 may then be created (operation 1004), possibly with a separate data directory stored in a separate location in a local file system of the storage node 506. Each logical object in the replica set 502 that is not expired or marked for deletion may then be copied to a new database using the temporary database process 508 (operation 1006). All of the copied logical objects may then be "flushed and synced" to ensure any of that data remaining in cache is recorded at its final destination (e.g., to a disk drive) (operation 1008). The logical objects stored via the temporary database process 508 may then be copied to other storage nodes 506 hosting the same replica set 502 (operation 1010). The operation log may then be replayed, starting from the captured operation log record, onto the same replica set 502 using the name of the new database 510 (operation 1012). The node manager 302 may instruct the local database proxy 304 to replace the previous database 510 name with the new database 510 name and to pass write requests to the new database 510 without any modifications (operation 1014). The node manager 302 may also instruct a coordinator 630 of the coordination tier 120 to update the bucket/database name map 618 with the new database 510 name (operation 1018) and to notify the service tier 110 of the update to the map 618 (operation 1020). Once the various service nodes 112 of the service tier 110 have confirmed the database name change, the node manager 302 may terminate the operation log replay (operation 1022).

In some example embodiments, the node manager 302, the coordination tier 120, or another entity of the distributed storage system 100 may split a bucket 504 into at least two separate, smaller buckets to equalize storage volume utilization across replica sets 502. As discussed above, a bucket 504 may be assigned a set of hashes, as indicated in the hash/bucket map 612 of the configuration registry 610 in the coordination tier 120. To split that bucket 504, the hashes of the bucket 504 may be divided somewhat evenly into two new buckets 504 based on one or more factors, such as the relative proximity of the values of hashes, resulting in a distinct range of hashes for each of the buckets 504. After the hashes have been separated into the two separate buckets 504, the method 1000 may be employed to generate two new buckets 504 and associated databases 510 (instead of the one new database 510 referenced in method 1000) and cause one or more maps (e.g., the hash/bucket map 612, the bucket/replica map 614, and/or the bucket/database name map 618) of the configuration registry 610 to be updated.

Figure 11:
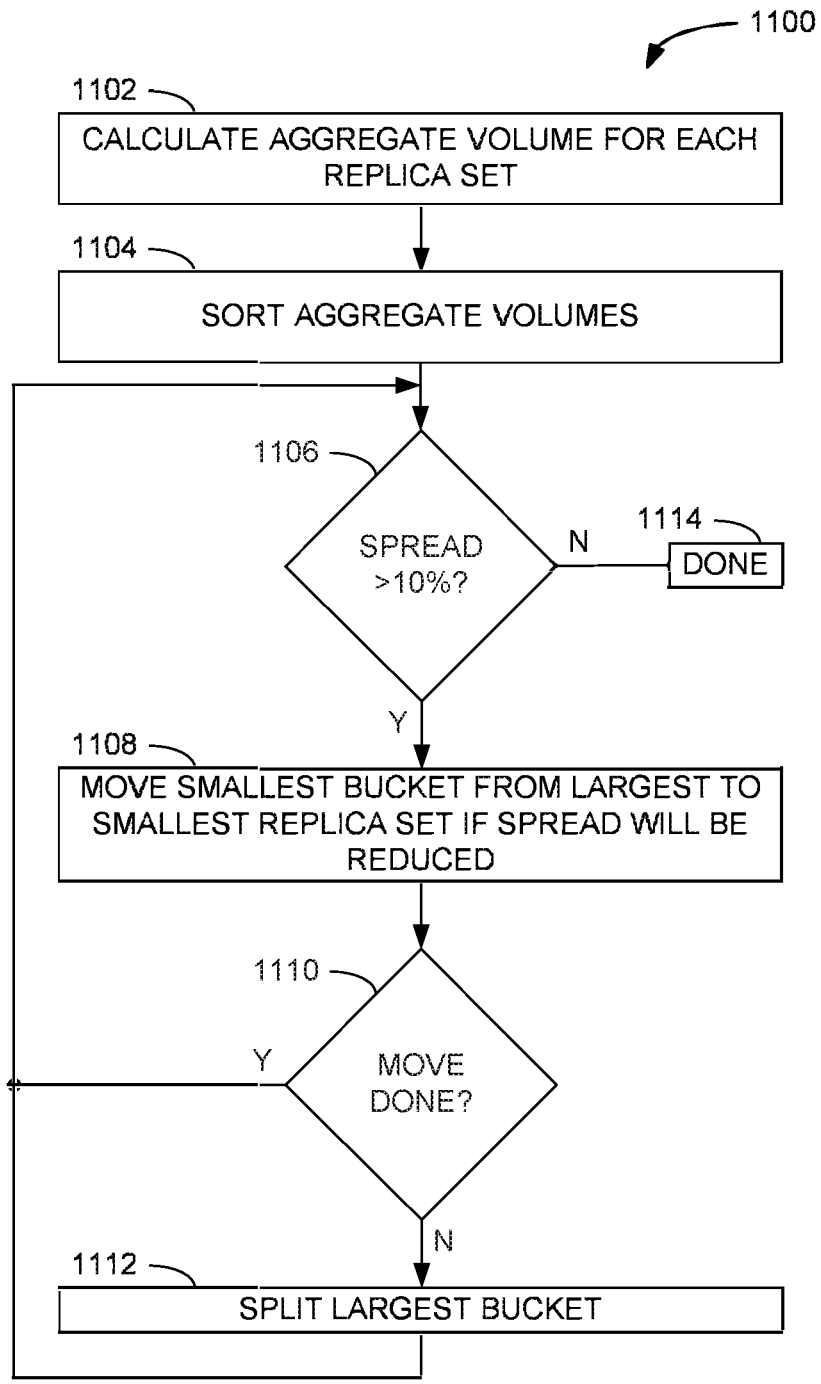
FIG. 11 is a flow diagram of an example method of bucket rebalancing in the distributed storage system of FIG. 1.

FIG. 11 is a flow diagram of an example method 1100 of bucket 504 rebalancing in the distributed storage system 100 of FIG. 1, which may also be performed by the node manager 302, the coordination tier 120, or another entity of the distributed storage system 100. In example embodiments, rebalancing of buckets 504 among replica sets 502 may be undertaken to equalize volatile memory, processor, and non-volatile storage across storage nodes 506, which may maximize the use of resources of each of the storage nodes 506.

In the method 1100, aggregate volume for each replica set 502 may be calculated (operation 1102) based on the volume of each bucket 504 and the mapping of buckets 504 to each replica set 502 of each tenant. The calculated volumes may then be sorted (operation 1104). If the difference or spread between the largest and smallest calculated volume of the replica sets 502 is greater than some predetermined percentage (e.g., ten percent) (operation 1106), the smallest bucket 504 may be moved from the largest replica set 502 to the smallest replica set 502 if such a move would improve (e.g., lessen) the difference or spread (operation 1108). If the move was performed (operation 1110), the spread may be checked again to determine if the spread is greater than the predetermined percentage (operation 1106), and another move may be performed (operation 1108). Otherwise, if the move was not performed (operation 1110), the largest bucket 504 may instead be split (operation 1112) into two or more separate buckets, as described above, before checking again if the spread is greater than the predetermined percentage (operation 1106). The method may end (operation 1114) if the spread drops below the percentage.

Figure 12:
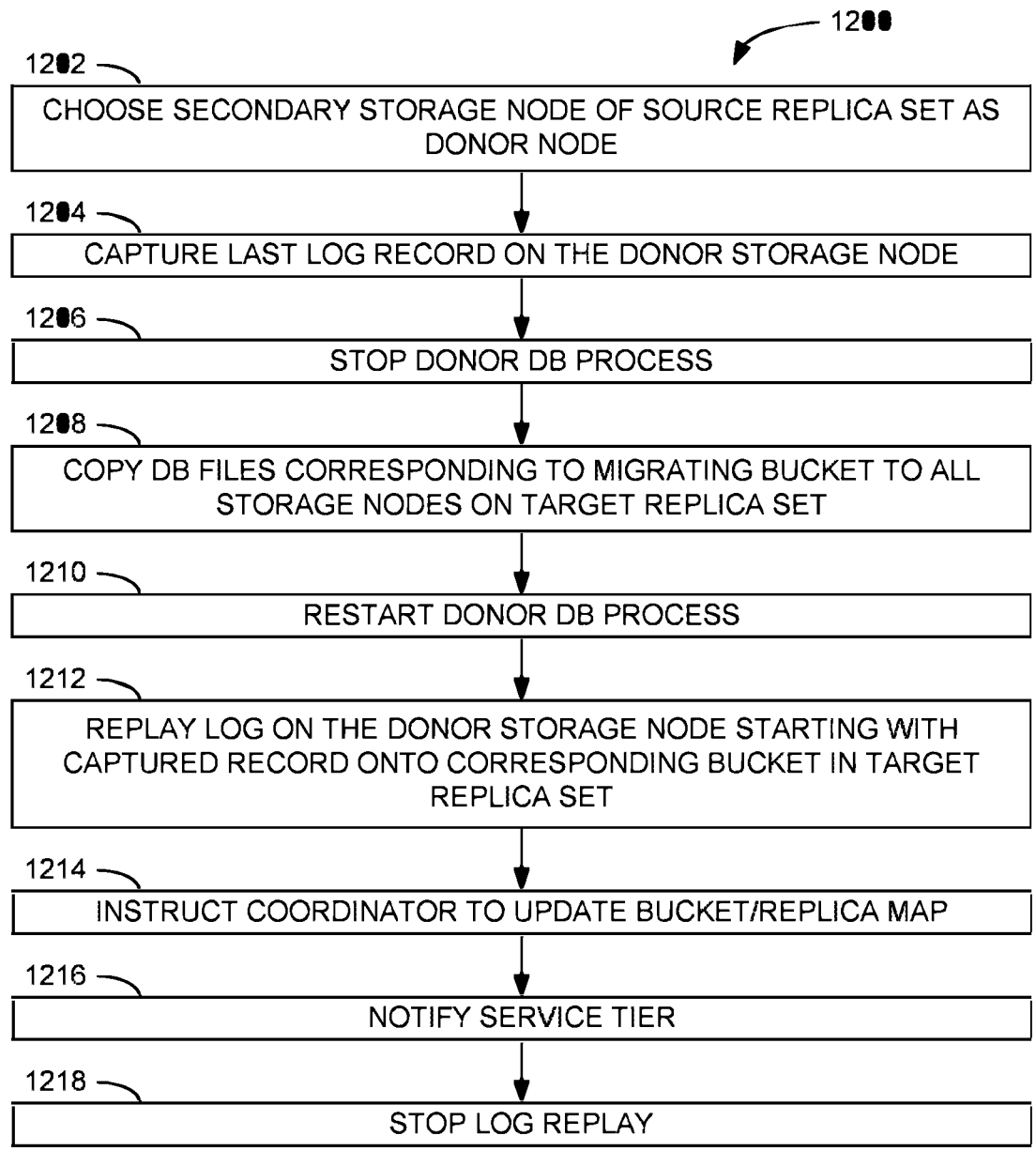
FIG. 12 is a flow diagram of an example method of bucket migration in the distributed storage system of FIG. 1.

FIG. 12 is a flow diagram of an example method 1200 of bucket 504 migration among replica sets 502 in the distributed storage system 100 of FIG. 1. The method 1200 may be useful in at least some example embodiments to achieve storage scalability, such as by increasing or decreasing the number of storage nodes 506 employed in the storage tier 130.

In the method 1200, a secondary storage node 506 of a source replica set 502 may be selected as a donor storage node 502 for the bucket 504 to be migrated (operation 1202). The last operation log record on the donor storage node 502 may be captured (operation 1204). The database process 508 corresponding to the source replica set 502 at the donor storage node 506 may then be stopped or suspended (operation 1206), and database files corresponding to the migrating bucket 504 may be copied to all storage nodes 506 of a target replica set 502 (operation 1208). The database process 508 corresponding to the source replica set 502 at the donor storage node 506 may then be restarted (operation 1210), and the operation log on the donor storage node 506 may be replayed onto the corresponding bucket 504 in the target replica set 502, starting from the captured log record (operation 1212). In at least some example embodiments, updates of other buckets 504 in the same database process 508 may be ignored during replay of the operation log. A coordinator 630 of the coordination tier 120 may then be instructed to update the bucket/replica map 614 to reflect the bucket 504 migration, and to notify the service tier 110 of the migration (operation 1216). Once all service instances at the service tier 110 have confirmed the bucket 504 migration, causing all update traffic to the bucket 504 of the source replica set 502 to stop, the operation log replay may be stopped (operation 1218).

Figure 13:
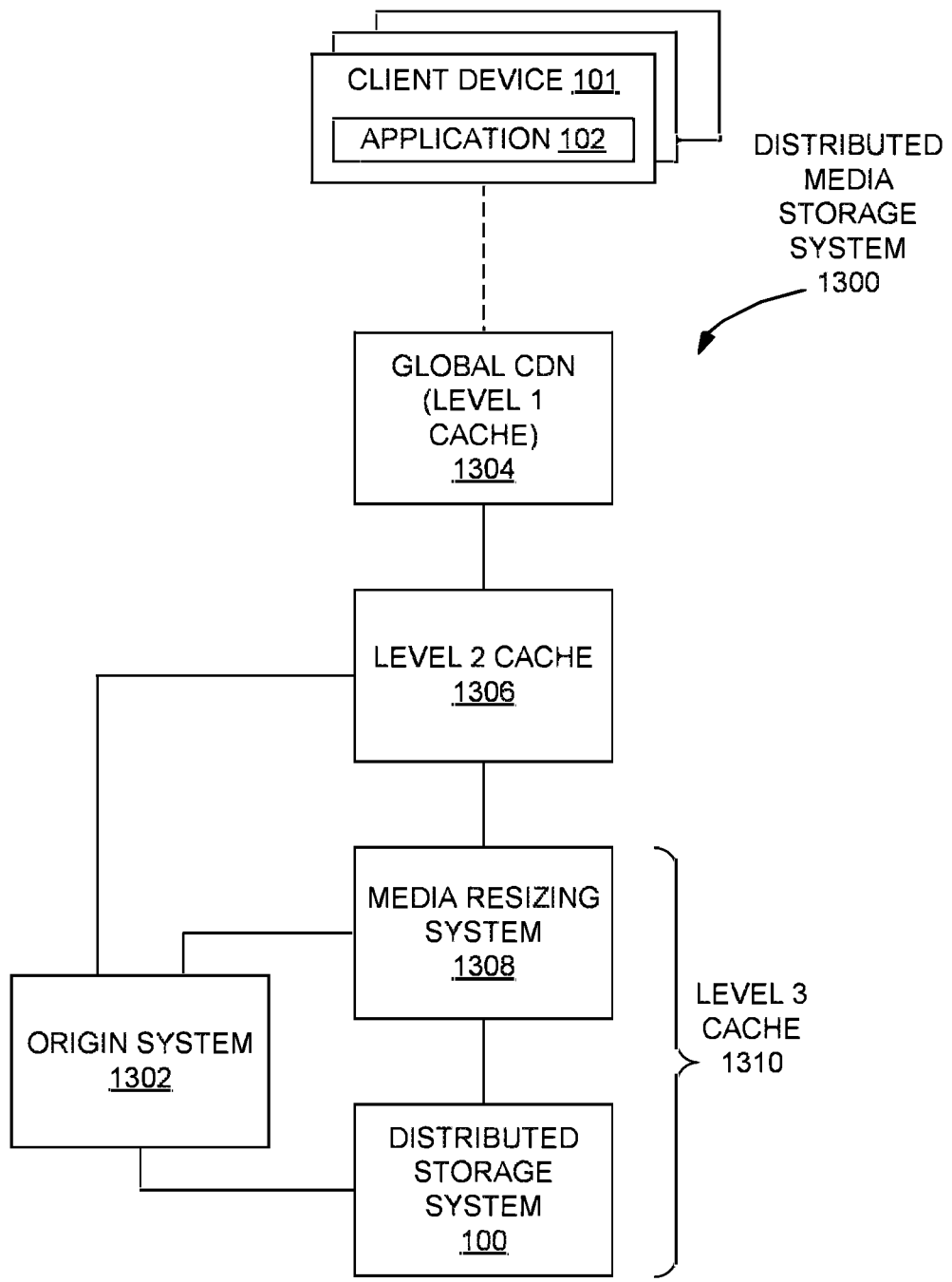
FIG. 13 is a block diagram of an example distributed media storage system including the distributed storage system of FIG. 1.

FIG. 13 is a block diagram of an example distributed media storage system 1300 including the distributed storage system 100 of FIG. 1. In an example embodiment, the distributed media storage system 1300 may be configured to store still images, video, audio, and other types of media content, along with associated metadata that may be employed in an online marketplace system accessible by the client devices 101 and associated applications 102 over a network, such as a WAN, LAN, cellular, and/or other network or communication connection. In the particular embodiments described below, the storage of still images is presumed; however, other types of media content (e.g. video or audio) may also be stored in, and accessed via, the distributed media storage system 1300.

The distributed media storage system 1300 may be structured as a multilevel cache system of three cache levels. Requests for images or other media content presented by a client device 101 may first be received at a global content delivery network (CDN) that may serve as a level 1 cached. The global CDN (e.g., an Akamai CDN) may include geographically distributed "edge" servers and associated storage that cache requested images for expedited responses to requests for those images. For those requests for images or other content items that are not currently available in the global CDN 1304, a level 2 cache 1306 may be employed to service one or more of those requests. If the requested image or other content item is not currently stored at the level 2 cache 1306, the request may be forwarded to a level 3 cache 1310 that includes a media resizing system 1308 and the distributed storage system 100 of FIG. 1. If the level 2 cache 1306 detects a failure with the level 3 cache 1310 or a component of the distributed media storage system 1300, the level 2 cache 1306 may forward the request directly to an origin system 1302 that serves as primary storage for the images and other media content of the distributed media storage system 1300.

In an example embodiment, the media resizing system 1308 of the level 3 cache 1310 may be configured to resize one or more images, video, or other media content at one or more additional resolutions, and to store copies of the resized content at the distributed storage system 100. One or more of the copies may be associated with a resolution intended for a particular display device, such as a computer monitor, tablet touchscreen, smart phone touchscreen, and/or the like. In some example embodiments, the media resizing system 1308 may generate ten-to-twenty copies at different resolutions of the original media content item. Also in some example embodiments, the media resizing system 1308 may generate a new copy of a media content item in response to a specific request for that resolution. For example, in response to a request for an image with a first resolution, the media resizing system 1308 may select, from multiple preexisting copies of the image, a copy that is at the lowest resolution greater than the requested resolution, and then generate a copy of the image at the requested resolution based on the selected copy of the image. In some example embodiments, using a relatively low-resolution image to generate a requested higher resolution image may cause a quality of the requested image to be of somewhat low quality. The media resizing system 1308 may exhibit similar behavior for video, audio, and other types of media content in some example embodiments.

In some example embodiments, the media resizing system 1308 may access the origin system 1302 directly to retrieve an original image or other media content item if that item, as well as any copies of the item at alternate resolutions, are not available in the distributed storage system 100. Further, the distributed storage system 100 may request or retrieve the original media content item and associated metadata from the origin system 1302 if a media content item requested via the media resizing system 1308 is not currently stored in the distributed storage system 100. In yet other example embodiments, the origin system 1302 may actively "push" one or more original media content items and corresponding metadata to the distributed storage system 100. For example, the origin system 1302 may push an image based on one or more factors, such as a prior request for an image that is related to the pushed image in some way (e.g., the pushed image is of the same item for sale as the prior image, the pushed image is for an item for sale by an entity that is also selling an item that is the subject of the prior image, the pushed image is of a competing item for sale relative to the item that is the subject of the prior image, and so on).

Figure 14:
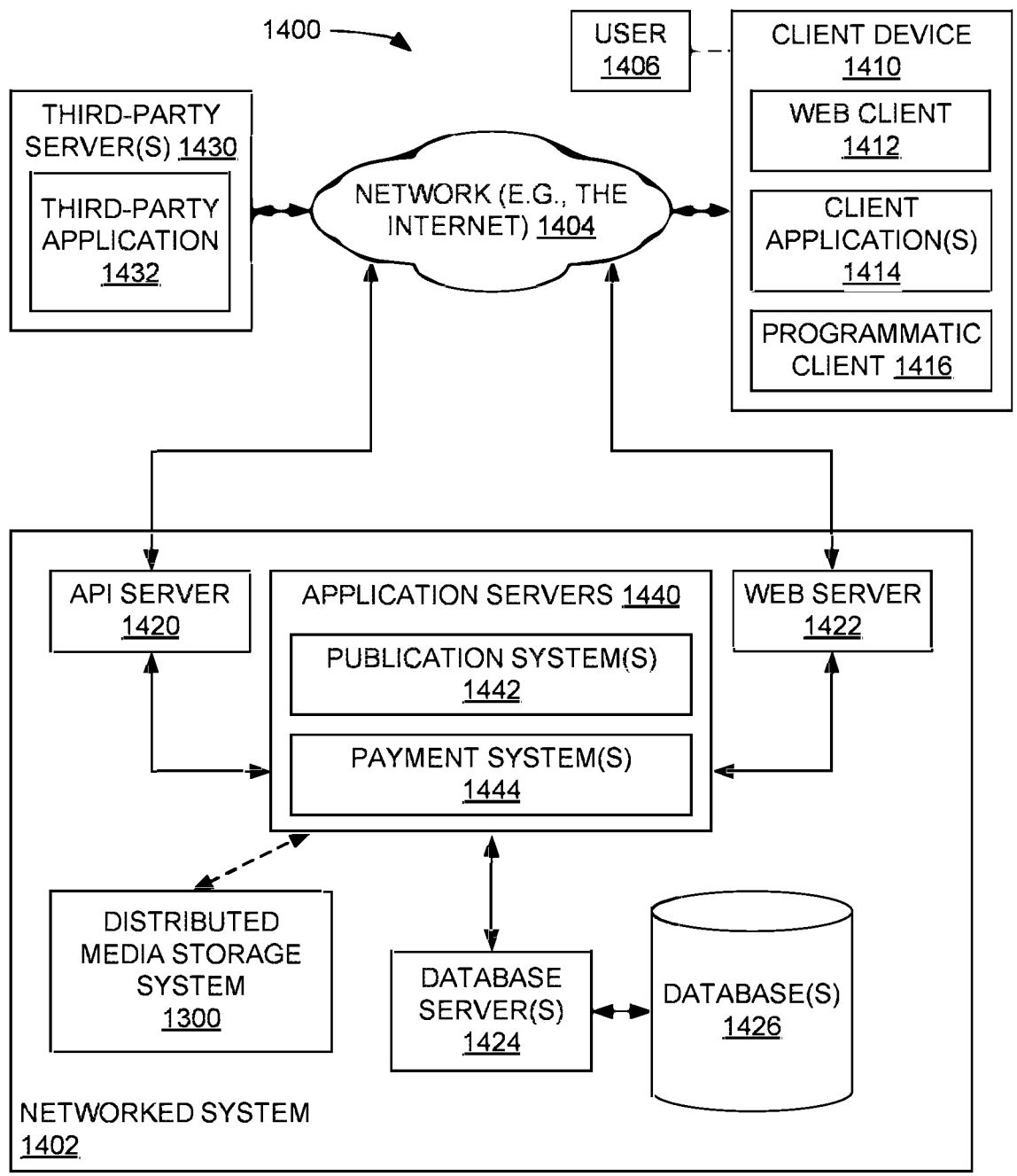
FIG. 14 is a block diagram of an example networked system in which the distributed media storage system of FIG. 13 may operate.

With reference to FIG. 14, an example embodiment of a high-level client-server-based network architecture 1400 is shown. A networked system 1402, in the example embodiments of a network-based marketplace or payment system, provides server-side functionality via a network 1404 (e.g., the Internet or wide area network (WAN)) to one or more client devices 1410. FIG. 14 illustrates, for example, a web client 1412 (e.g., a browser, such as the Internet Explorer® browser developed by Microsoft® Corporation of Redmond, Washington State), an application 1414, and a programmatic client 1416 executing on client device 1410.

The client device 1410 may include, but is not limited to, a mobile phone, desktop computer, laptop computer, tablet computer, smart phone, ultra book, netbook, multi-processor system, microprocessor-based or programmable consumer electronic device, game console, set-top box, or any other communication device that a user 1406 may utilize to access the networked system 1402. In some embodiments, the client device 1410 may include a display module (not shown) to display information (e.g., in the form of user interfaces). In further embodiments, the client device 1410 may include one or more of a touch screen, accelerometer, gyroscope, camera, microphone, global positioning system (GPS) device, and so forth. The client device 1410 may be a device of a user 1406 that is used to perform a transaction involving digital items within the networked system 1402. In one example embodiment, the networked system 1402 is a network-based marketplace that responds to requests for product listings, publishes publications that include item listings of products available on the network-based marketplace, and manages payments for these marketplace transactions. One or more users 1406 may be a person, a machine, or other means of interacting with client device 1410. In example embodiments, the user 106 is not part of the network architecture 1400, but may interact with the network architecture 1400 via the client device 1410 or another means. For example, one or more portions of network 1404 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi® network, a WiMAX™ network, another type of network, or a combination of two or more such networks.

The client device 1410 may include one or more applications (also referred to as "apps") such as, but not limited to, a web browser, a messaging application, an electronic mail (email) application, an e-commerce site application (also referred to as a marketplace application), and the like. In some example embodiments, if the e-commerce site application is included in a given one of the client device 1410, then this application is configured to locally provide the user interface and at least some of the functionalities with the application configured to communicate with the networked system 1402, on an as-needed basis, for data and/or processing capabilities not locally available (e.g., access to a database of items available for sale, to authenticate a user, to verify a method of payment, etc.). Conversely, if the e-commerce site application is not included in the client device 1410, the client device 1410 may use its web browser to access the e-commerce site (or a variant thereof) hosted on the networked system 1402.

One or more users 1406 may be a person, a machine, or other means of interacting with the client device 1410. In example embodiments, the user 1406 is not part of the network architecture 1400, but may interact with the network architecture 1400 via the client device 1410 or other means. For instance, the user 1406 provides input (e.g., touch screen input or alphanumeric input) to the client device 1410 and the input is communicated to the networked system 1402 via the network 1404. In this instance, the networked system 1402, in response to receiving the input from the user, communicates information to the client device 1410 via the network 1404 to be presented to the user 1406. In this way, the user 1406 can interact with the networked system 1402 using the client device 1410.

An application program interface (API) server 1420 and a web server 1422 are coupled to, and provide programmatic and web interfaces respectively to, one or more application servers 1440. The application servers 1440 may host one or more publication systems 1442 and payment systems 1444, each of which may include one or more modules or applications and each of which may be embodied as hardware, software, firmware, or any combination thereof. The application servers 1440 may be coupled to one or more database servers 1424 that facilitate access to one or more information storage repositories or database(s) 1426. In an example embodiment, the databases 1426 are storage devices that store information to be posted (e.g., publications or listings) to the publication system 1420. The databases 1426 may also store digital item information in accordance with example embodiments.

Additionally, a third party application 1432, executing on third-party server(s) 1430, is shown as having programmatic access to the networked system 1402 via the programmatic interface provided by an API server 1420. For example, the third-party application 1432, utilizing information retrieved from the networked system 1402, supports one or more features or functions on a website hosted by the third party. The third-party website, for example, provides one or more promotional, marketplace, or payment functions that are supported by the relevant applications of the networked system 1402.

The publication systems 1442 may provide a number of publication functions and services to users 1406 that access the networked system 1402. The payment systems 1444 may likewise provide a number of functions to perform or facilitate payments and transactions. While the publication system 1442 and payment system 1444 are shown in FIG. 14 to both form part of the networked system 1402, it will be appreciated that, in alternative embodiments, each system 1442 and 1444 may form part of a payment service that is separate and distinct from the networked system 1402. In some embodiments, the payment systems 1444 may form part of the publication system 1442.

As depicted in FIG. 14, the distributed media storage system 1300 of FIG. 13 may be incorporated within the networked system 1402. For example, the distributed media storage system 1300 may store visual images, video or audio clips, of one or more items published via the publication system(s) 1444 that are available for sale to the user 1406. In an example embodiment, the distributed media storage system 1300 may be embodied as a platform service to the applications servers 1440, as well as to the API server 1420 and the web server 1422 to provide media content item storage and access functionality in conjunction with the publication system 1442 or other systems of the networked system 1402.

While the client-server-based network architecture 1400 shown in FIG. 14 employs a client-server architecture, the present subject matter is of course not limited to such an architecture, and could equally well find application in a distributed, or peer-to-peer, architecture system, for example. The publication system 1442, payment system 1444, and distributed media storage system 1300 could also be implemented as standalone software programs, which do not necessarily have networking capabilities.

The web client 1412 may access the various publication and payment systems 1442 and 1444 via the web interface supported by the web server 1422. Similarly, the programmatic client 1416 accesses the various services and functions provided by the publication and payment systems 1442 and 1444 via the programmatic interface provided by the API server 1420. The programmatic client 1416 may, for example, be a seller application (e.g., the Turbo Lister application developed by eBay® Inc., of San Jose, California) to enable sellers to author and manage listings on the networked system 1402 in an offline manner, and to perform batch-mode communications between the programmatic client 1416 and the networked system 1402.

Additionally, one or more third-party applications 1432, executing on one or more third-party servers 1430, is shown as having programmatic access to the networked system 1402 via the programmatic interface provided by the API server 1414. For example, the third-party application 1432, utilizing information retrieved from the networked system 1402, may support one or more features or functions on a website hosted by the third party. The third-party website may provide, for example, one or more promotional, marketplace, or payment functions that are supported by the relevant applications of the networked system 1402.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application-Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module includes a general-purpose processor configured by software to become a special-purpose processor, the general-purpose processor may be configured as respectively different special-purpose processors (e.g., including different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-13 may implemented in some embodiments in the context of a machine and an associated software architecture. The sections below describe representative software architectures and machine (e.g., hardware) architectures that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the disclosed subject matter in different contexts from the disclosure contained herein.

Software Architecture

Figure 15:
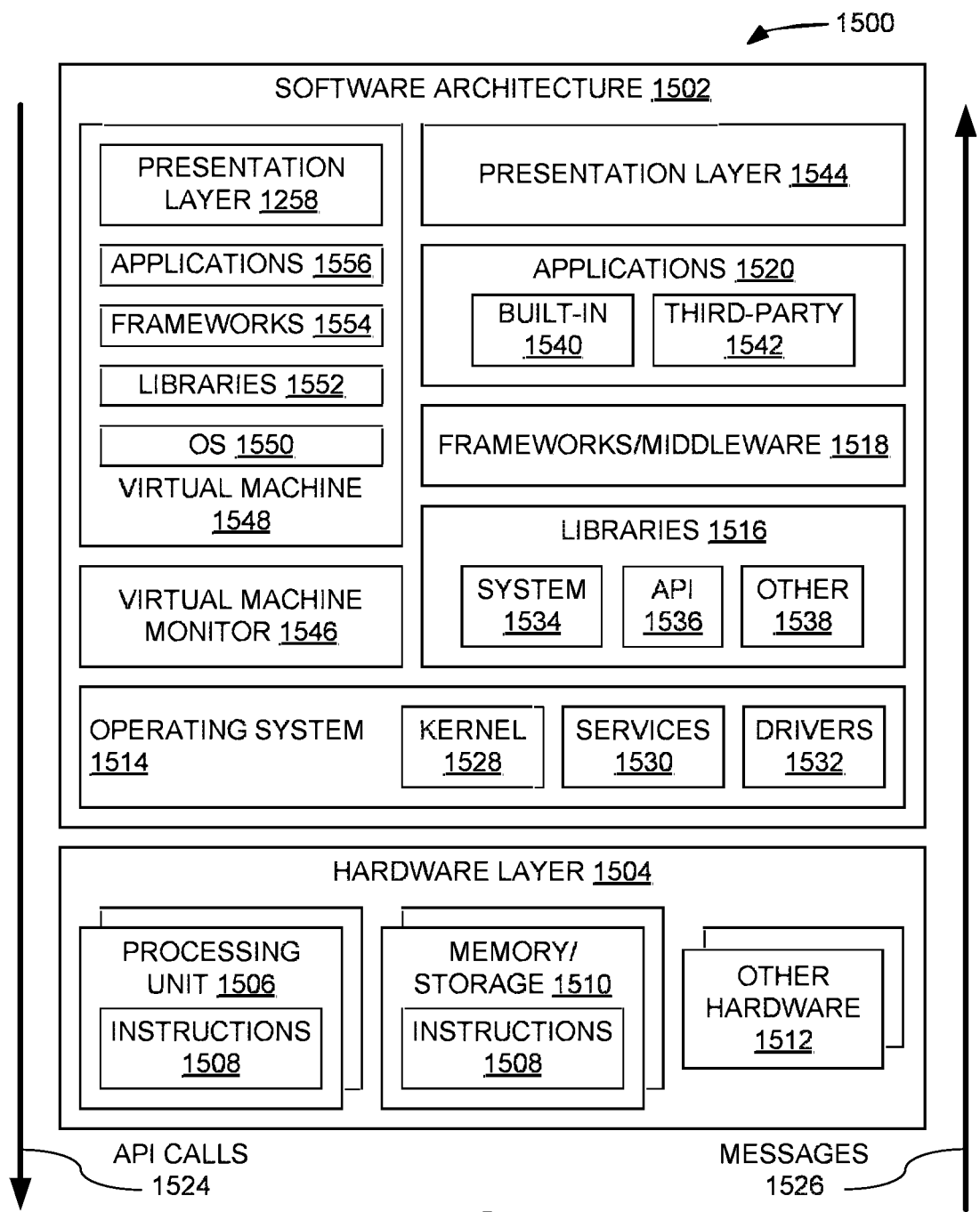
FIG. 15 is a block diagram illustrating an example of a software architecture that may be installed on a machine, according to some example embodiments.

FIG. 15 is a block diagram 1500 illustrating a representative software architecture 1502, which may be used in conjunction with various hardware architectures herein described. FIG. 15 is merely a non-limiting example of a software architecture and it will be appreciated that many other architectures may be implemented to facilitate the functionality described herein. The software architecture 1502 may be executing on hardware such as machine 1600 of FIG. 16 that includes, among other things, processors 1610, memory 1630, and I/O components 1650. A representative hardware layer 1504 is illustrated and can represent, for example, the machine 1600 of FIG. 16. The representative hardware layer 1504 may include one or more processing units 1506 having associated executable instructions 1508. Executable instructions 1508 represent the executable instructions of the software architecture 1502, including implementation of the methods, modules, and so forth associated with the distributed storage system 100 of FIG. 1 and the distributed media storage system 1300 of FIG. 13, as discussed above in reference to FIGS. 1-13. Hardware layer 1504 also includes memory and/or storage modules 1510, which also have executable instructions 1508. Hardware layer 1504 may also include other hardware as indicated by 1512 which represents any other hardware of the hardware layer 1504, such as the other hardware illustrated as part of machine 1500.

In the example architecture of FIG. 15, the software architecture 1502 may be conceptualized as a stack of layers where each layer provides particular functionality. For example, the software 1502 may include layers such as an operating system 1514, libraries 1516, frameworks/middleware 1518, applications 1520 and presentation layer 1522. Operationally, the applications 1520 and/or other components within the layers may invoke application programming interface (API) calls 1524 through the software stack and receive a response, returned values, and so forth illustrated as messages 1526 in response to the API calls 1524. The layers illustrated are representative in nature and not all software architectures have all layers. For example, some mobile or special purpose operating systems may not provide a frameworks/middleware layer 1518, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 may provide a common infrastructure that may be utilized by the applications 1520 and/or other components and/or layers. The libraries 1516 typically provide functionality that allows other software modules to perform tasks in an easier fashion than to interface directly with the underlying operating system 1514 functionality (e.g., kernel 1528, services 1530 and/or drivers 1532). The libraries 1516 may include system 1534 libraries (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks 1518 (also sometimes referred to as middleware) may provide a higher-level common infrastructure that may be utilized by the applications 1520 and/or other software components/modules. For example, the frameworks 1518 may provide various graphic user interface (GUI) functions, high-level resource management, high-level location services, and so forth. The frameworks 1518 may provide a broad spectrum of other APIs that may be utilized by the applications 1520 and/or other software components/modules, some of which may be specific to a particular operating system or platform.

The applications 1520 may include built-in applications 1540 and/or third party applications 1542. Examples of representative built-in applications 1540 may include, but are not limited to, a contacts application, a browser application, a book reader application, a location application, a media application, a messaging application, and/or a game application. Third party applications 1542 may include any of the built-in applications as well as a broad assortment of other applications. In a specific example, the third party application 1542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1542 may invoke the API calls 1524 provided by the mobile operating system such as operating system 1514 to facilitate functionality described herein.

The applications 1520 may utilize built-in operating system functions (e.g., kernel 1528, services 1530 and/or drivers 1532), libraries (e.g., system 1534, APIs 1536, and other libraries 1538), and frameworks/middleware 1518 to create user interfaces to interact with users of the system. Alternatively, or additionally, in some systems, interactions with a user may occur through a presentation layer, such as presentation layer 1544. In these systems, the application/module "logic" can be separated from the aspects of the application/module that interact with a user.

Some software architectures utilize virtual machines. In the example of FIG. 15, this is illustrated by virtual machine 1548. A virtual machine creates a software environment where applications/modules can execute as if they were executing on a hardware machine (such as the machine of FIG. 15, for example). A virtual machine is hosted by a host operating system (operating system 1514 in FIG. 15) and typically, although not always, has a virtual machine monitor 1546, which manages the operation of the virtual machine as well as the interface with the host operating system (i.e., operating system 1514). A software architecture executes within the virtual machine such as an operating system 1550, libraries 1552, frameworks/middleware 1554, applications 1556 and/or presentation layer 1558. These layers of software architecture executing within the virtual machine 1548 can be the same as corresponding layers previously described or may be different.

Example Machine Architecture and Machine-Readable Medium

Figure 16:
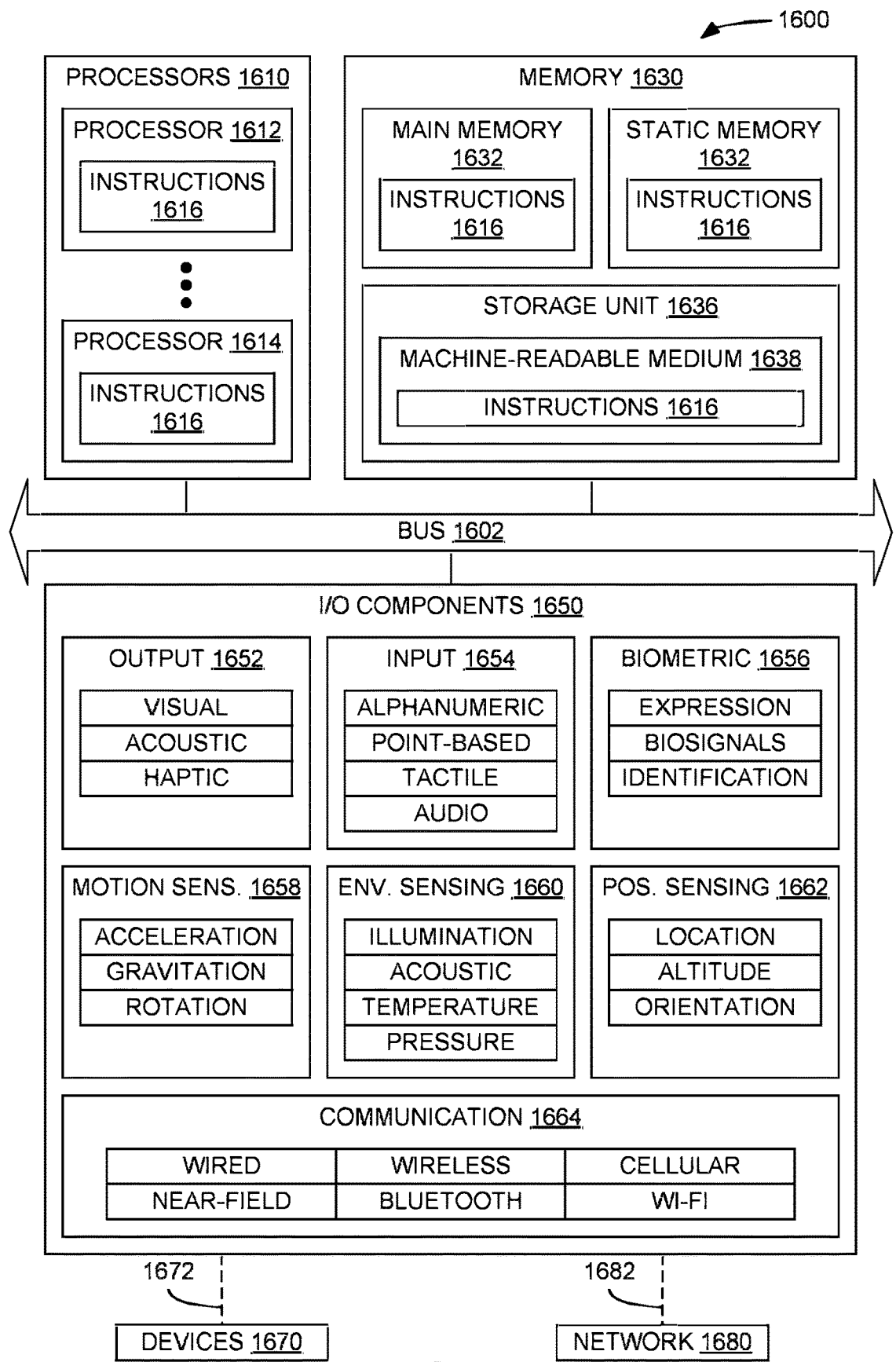
FIG. 16 illustrates a diagrammatic representation of a machine in the form of a computer system within which a set of instructions may be executed for causing the machine to perform any one or more of the methodologies discussed herein, according to an example embodiment.

FIG. 16 is a block diagram illustrating components of a machine 1600, according to some example embodiments, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1616 (e.g., software, a program, an application, an applet, an app, or other executable code) for causing the machine 1600 to perform any one or more of the methodologies discussed herein may be executed. For example, the instructions may cause the machine to execute the flow diagram of FIGS. 9-12. Additionally, or alternatively, the instructions may implement the service tier 110, the coordination tier 120, and the storage tier 130 of FIG. 1, as well as the various modules and associated code segments thereof, as illustrated in FIGS. 2-8, and so forth. Moreover, the instructions may implement the global CDN 134, level 2 cache 1306, media resizing system 1308, and/or the origin system 1302 of FIG. 13. The instructions transform the general, non-programmed machine into a particular machine programmed to carry out the described and illustrated functions in the manner described. In alternative embodiments, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may include, but is not limited to, a server computer, a client computer, a personal computer (PC), or any machine capable of executing the instructions 1616, sequentially or otherwise, that specify actions to be taken by machine 1600. Further, while only a single machine 1600 is illustrated, the term "machine" shall also be taken to include a collection of machines 1600 that individually or jointly execute the instructions 1616 to perform any one or more of the methodologies discussed herein.

The machine 1600 may include processors 1610, memory 1630, and I/O components 1650, which may be configured to communicate with each other such as via a bus 1602. In an example embodiment, the processors 1610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1612 and processor 1614 that may execute instructions 1616. The term "processor" is intended to include multi-core processor that may include two or more independent processors (sometimes referred to as "cores") that may execute instructions contemporaneously. Although FIG. 16 shows multiple processors, the machine 1600 may include a single processor with a single core, a single processor with multiple cores (e.g., a multi-core process), multiple processors with a single core, multiple processors with multiples cores, or any combination thereof.

The memory/storage 1630 may include a memory 1632, such as a main memory, or other memory storage, and a storage unit 1636, both accessible to the processors 1610 such as via the bus 1602. The storage unit 1636 and memory 1632 store the instructions 1616 embodying any one or more of the methodologies or functions described herein. The instructions 1616 may also reside, completely or partially, within the memory 1632, within the storage unit 1636, within at least one of the processors 1610 (e.g., within the processor's cache memory), or any suitable combination thereof, during execution thereof by the machine 1600. Accordingly, the memory 1632, the storage unit 1636, and the memory of processors 1610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Electrically Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1616. The term "machine-readable medium" shall also be taken to include any medium, or combination of multiple media, that is capable of storing instructions (e.g., instructions 1616) for execution by a machine (e.g., machine 1600), such that the instructions, when executed by one or more processors of the machine 1600 (e.g., processors 1610), cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1650 may include a wide variety of components to receive input, provide output, produce output, transmit information, exchange information, capture measurements, and so on. The specific I/O components 1650 that are included in a particular machine will depend on the type of machine. For example, portable machines such as mobile phones will likely include a touch input device or other such input mechanisms, while a headless server machine will likely not include such a touch input device. It will be appreciated that the I/O components 1650 may include many other components that are not shown in FIG. 16. The I/O components 1650 are grouped according to functionality merely for simplifying the following discussion and the grouping is in no way limiting. In various example embodiments, the I/O components 1650 may include output components 1652 and input components 1654. The output components 1652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1650 may include biometric components 1656, motion components 1658, environmental components 1660, or position components 1662 among a wide array of other components. For example, the biometric components 1656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1658 may include acceleration sensor components (e.g., accelerometer), gravitation sensor components, rotation sensor components (e.g., gyroscope), and so forth. The environmental components 1660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1650 may include communication components 1664 operable to couple the machine 1600 to a network 1680 or devices 1670 via coupling 1682 and coupling 1672 respectively. For example, the communication components 1664 may include a network interface component or other suitable device to interface with the network 1680. In further examples, communication components 1664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1670 may be another machine or any of a wide variety of peripheral devices (e.g., a peripheral device coupled via a Universal Serial Bus (USB)).

Moreover, the communication components 1664 may detect identifiers or include components operable to detect identifiers. For example, the communication components 1664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals).

In addition, a variety of information may be derived via the communication components 1664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1680 or a portion of the network 1680 may include a wireless or cellular network and the coupling 1682 may be a Code Division Multiple Access (CDMA) connection, a Global System for Mobile communications (GSM) connection, or other type of cellular or wireless coupling. In this example, the coupling 1682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX™), Long Term Evolution (LTE) standard, others defined by various standard setting organizations, other long range protocols, or other data transfer technology.

The instructions 1616 may be transmitted or received over the network 1680 using a transmission medium via a network interface device (e.g., a network interface component included in the communication components 1664) and utilizing any one of a number of well-known transfer protocols (e.g., hypertext transfer protocol (HTTP)). Similarly, the instructions 1616 may be transmitted or received using a transmission medium via the coupling 1672 (e.g., a peer-to-peer coupling) to devices 1670. The term "transmission medium" shall be taken to include any intangible medium that is capable of storing, encoding, or carrying instructions 1616 for execution by the machine 1600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The example embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method implemented by a client device, the method comprising:
   generating a request to access a logical object from a distributed storage system, the request including an identifier for the client device and an identifier for the logical object, the logical object comprising binary data and metadata describing characteristics of the binary data;
   transmitting the request to the distributed storage system, the distributed storage system configured to store a plurality of replica sets that each include a replica of the metadata and associate a storage partition identifier with each replica of the metadata, the transmitting causing the distributed storage system to:
   select a first location based on the identifier for the client device, the first location corresponding to the storage partition identifier of one of the plurality of replica sets for which the client device has access;
   access the metadata from the first location;
   retrieve, from the accessed metadata, location information indicating a second storage location at which the binary data is stored; and
   access the binary data from the second storage location based on the location information included in the metadata and return the binary data and at least a portion of the metadata in a response to the client device; and
   receiving the response to the request, the response including the binary data and at least the portion of the metadata.

2. The method of claim 1, wherein the transmitting causes the distributed storage system to generate a hash of the identifier for the logical object and access the first location corresponding to the one of the plurality of replica sets based on the hash of the identifier.

3. The method of claim 1, wherein the method further comprises receiving, from the distributed storage system, a record of access events corresponding to the binary data, the access events including the identifier for the logical object and an access time indicating when the binary data was accessed from the second storage location.

4. The method of claim 1, further comprising transmitting an update message to the distributed storage system, the update message comprising a command to update mapping information identifying locations associated with the plurality of replica sets and causing the distributed storage system to update mapping information stored at the distributed storage system based on the update message.

5. The method of claim 4, wherein transmitting the update message further causes the distributed storage system to inform a service node of the update to the mapping information, the service node facilitating directing requests for servicing to one or more storage locations including the first storage location.

6. The method of claim 4, wherein the mapping information comprises information relating the storage partition identifier to a replica set identifier of one or the plurality of replica sets.

7. The method of claim 4, wherein the mapping information comprises information relating the first location to a database process instance executing within the first location.

8. The method of claim 4, wherein the mapping information comprises information relating the first location with a database name.

9. The method of claim 1, wherein the binary data comprises at least one binary large object that is stored at the distributed storage system, and wherein the storage partition identifier identifies a storage node at which a given replica of the metadata is located.

10. A non-transitory computer-readable storage medium storing instructions that, when executed by one or more hardware processors of a machine, cause the machine to perform operations comprising:
generating a request to access a logical object from a distributed storage system, the request including an identifier for the machine and an identifier for the logical object, the logical object comprising binary data and metadata describing characteristics of the binary data;
transmitting the request to the distributed storage system, the distributed storage system configured to store a plurality of replica sets that each include a replica of the metadata and associate a storage partition identifier with each replica of the metadata, the transmitting causing the distributed storage system to:
select a first location based on the identifier for the machine, the first location corresponding to the storage partition identifier of one of the plurality of replica sets for which the machine has access;
access the metadata at the first location;
retrieve, from the accessed metadata, location information indicating a second storage location at which the binary data is stored; and
access the binary data from the second storage location based on the location information included in the metadata and return the binary data and at least a portion of the metadata in a response to the machine; and
receiving the response to the request, the response including the binary data and at least the portion of the metadata.

11. The non-transitory computer-readable storage medium of claim 10, wherein the transmitting causes the distributed storage system to generate a hash of the identifier for the logical object and access the first location corresponding to the one of the plurality of replica sets based on the hash of the identifier.

12. The non-transitory computer-readable storage medium of claim 10, the operations further comprising receiving, from the distributed storage system, a record of access events corresponding to the binary data, the access events including the identifier for the logical object and an access time indicating when the binary data was accessed from the second storage location.

13. The non-transitory computer-readable storage medium of claim 10, the operations further comprising transmitting an update message to the distributed storage system, the update message comprising a command to update mapping information identifying locations associated with the plurality of replica sets and causing the distributed storage system to update mapping information stored at the distributed storage system based on the update message.

14. The non-transitory computer-readable storage medium of claim 13, wherein transmitting the update message further causes the distributed storage system to inform a service node of the update to the mapping information, the service node facilitating directing requests for servicing to one or more storage locations including the first location.

15. A system comprising:
one or more processors; and
a computer-readable storage medium storing instructions that are executable by the one or more processors to perform operations comprising:
generating a request to access a logical object from a distributed storage system, the request including an identifier for a client device requesting access to the logical object and an identifier for the logical object, the logical object comprising binary data and metadata describing characteristics of the binary data;
transmitting the request to the distributed storage system, the distributed storage system configured to store a plurality of replica sets that each include a replica of the metadata and associate a storage partition identifier with each replica of the metadata, the transmitting causing the distributed storage system to:
select a first location based on the identifier for the client device, the first location corresponding to one of the plurality of replica sets for which the client device has access;
access the metadata from the first location;
retrieve, from the accessed metadata, location information indicating a second storage location at which the binary data is stored; and
access the binary data from the second storage location based on the location information included in the metadata and return the binary data and at least a portion of the metadata in a response to the request; and
receiving the response to the request at the client device, the response including the binary data and at least the portion of the metadata.

16. The system of claim 15, wherein the transmitting causes the distributed storage system to generate a hash of the identifier for the logical object and access the first location corresponding to the one of the plurality of replica sets based on the hash of the identifier.

17. The system of claim 15, the operations further comprising receiving, from the distributed storage system, a record of access events corresponding to the binary data, the access events including the identifier for the logical object and an access time indicating when the binary data was accessed from the second storage location.

18. The system of claim 15, the operations further comprising transmitting an update message to the distributed storage system, the update message comprising a command to update mapping information identifying locations associated with the plurality of replica sets and causing the distributed storage system to update mapping information stored at the distributed storage system based on the update message.

19. The system of claim 18, wherein transmitting the update message further causes the distributed storage system to inform a service node of the update to the mapping information, the service node facilitating directing requests for servicing to one or more storage locations including the first storage location.

20. The method of claim 1, wherein the distributed storage system is configured to store the binary data for the logical object in a storage location that is separate from storage locations of each of the plurality of replica sets storing the metadata for the logical object, and wherein the client device does not store the logical object.

\* \* \* \* \*